(12) United States Patent
Huss et al.

(10) Patent No.: US 12,520,335 B2
(45) Date of Patent: Jan. 6, 2026

(54) METHOD AND APPARATUS FOR SPECTRUM SHARING IN WIRELESS COMMUNICATION NETWORKS

(71) Applicant: Telefonaktiebolaget LM Ericsson (publ), Stockholm (SE)

(72) Inventors: Fredrik Huss, Sundbyberg (SE); Robert Baldemair, Solna (SE); Franz Heiser, Järfälla (SE); Gary Boudreau, Kanata (CA); Luke Williams, Scarborough (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 557 days.

(21) Appl. No.: 17/428,664

(22) PCT Filed: Feb. 13, 2020

(86) PCT No.: PCT/IB2020/051215
§ 371 (c)(1),
(2) Date: Aug. 5, 2021

(87) PCT Pub. No.: WO2020/165842
PCT Pub. Date: Aug. 20, 2020

(65) Prior Publication Data
US 2022/0132509 A1    Apr. 28, 2022

Related U.S. Application Data

(60) Provisional application No. 62/806,090, filed on Feb. 15, 2019.

(51) Int. Cl.
*H04W 72/53* (2023.01)
*H04L 1/00* (2006.01)
(Continued)

(52) U.S. Cl.
CPC .......... *H04W 72/53* (2023.01); *H04L 1/0002* (2013.01); *H04W 16/14* (2013.01); *H04W 72/0453* (2013.01)

(58) Field of Classification Search
CPC . H04W 72/53; H04W 16/14; H04W 72/0453; H04L 1/0002
See application file for complete search history.

(56) References Cited

U.S. PATENT DOCUMENTS

2019/0103954 A1*  4/2019  Lee ................. H04L 5/0098
2019/0312763 A1* 10/2019  Lei ................. H04L 5/0026
(Continued)

FOREIGN PATENT DOCUMENTS

CN    108353460 A    7/2018
CN    108702266 A   10/2018
(Continued)

OTHER PUBLICATIONS

Samsung, Activation/deactivation of bandwidth parts in NR. Oct. 2017, R2-1711189, pp. 1-4 (Year: 2017).*
(Continued)

*Primary Examiner* — Jackie Zuniga Abad
(74) *Attorney, Agent, or Firm* — Sage Patent Group

(57) ABSTRACT

Regarding a first radio frequency (RF) carrier, a network node of a wireless communication network configures two or more bandwidth parts (BWPs) in the first RF carrier, each BWP aligning with a respective one of two or more other RF carriers positioned within the RF spectrum spanned by the first RF carrier. The node determines a frequency-sharing configuration for each BWP, in dependence on radio resource usage of the respective other RF carrier and configures wireless communication devices to use respective ones of the BWPs. For example, the node determines a resource-usage pattern for control-related signaling con-
(Continued)

veyed on the other RF carriers and transmits rate-matching information for the BWPs of the first RF carrier. Each BWP occupies RF spectrum used by a respective one of the other RF carriers, and the rate-matching information transmitted for each BWP depends on the resource-usage pattern determined for the respective other RF carrier.

18 Claims, 13 Drawing Sheets

(51) Int. Cl.
*H04W 16/14* (2009.01)
*H04W 72/0453* (2023.01)

(56) References Cited

U.S. PATENT DOCUMENTS

2020/0170022 A1* 5/2020 Jones ............... H04W 72/0446
2021/0160872 A1* 5/2021 Lin .................... H04W 4/40

FOREIGN PATENT DOCUMENTS

| KR | 20180129620 A | 12/2018 |
|---|---|---|
| WO | 2018031746 A1 | 2/2018 |
| WO | 2018174766 A1 | 9/2018 |
| WO | 2018178309 A1 | 10/2018 |
| WO | 2018199691 A1 | 11/2018 |

OTHER PUBLICATIONS

3GPP, "3GPP TS 38.214 V15.3.0", 3rd Generation Partnership Project; Technical Specification Group Radio Access Network; NR; Physical layer procedures for data (Release 15), Sep. 2018, 1-96.
3GPP, "3rd Generation Partnership Project; Technical Specification Group Radio Access Network; NR; Physical channels and modulation (Release 15)", 3GPP TS 38.211 V15.3.0, Sep. 2018, 1-96.
Ericsson, "On Matching Transmissions to Available Resources", 3GPP TSG-RAN WG1 90bis, R1-1718522, Ericsson, Prague, Czech Republic, Oct. 9-13, 2017, 3 pages.
Fujitsu, "On Wideband Operation for NR-U", 3GPP TSG RAN WG1 Ad-Hoc Meeting 1901, R1-1900246, Fujitsu, Taipei, Taiwan, Jan. 21-25, 2019, 5 pages.
LG Electronics, "Summary on Wide-Band Operation for NR-U", 3GPP TSG RAN WG1 Ad-Hoc Meeting 1901, R1-1901336, LG Electronics, Taipei, Taiwan, Jan. 21-25, 2019, 11 pages.
AT&T 3GPP TSG-RAN WG3 AdHoc; R3-180499; "Signaling support for LTE-NR Coexistence in Overlapping and Adjacent Spectrum"; Agenda Item 10.14.1; Sophia-Antipolis, France; Jan. 22-26, 2018; 4 pages.
Office Action mailed Dec. 16, 2024 for Chinese Patent Application No. 202080014628.0; 27 pages (includes English translation).

* cited by examiner

METHOD AND APPARATUS FOR SPECTRUM SHARING IN WIRELESS COMMUNICATION NETWORKS

TECHNICAL FIELD

The present disclosure generally relates to the field of wireless network communications, and, more particularly, to network nodes that involve Dynamic Spectrum Sharing (DSS) by the allocation of Bandwidth Parts (BWP).

BACKGROUND

Key challenges arise in the context of deploying new wireless communication technologies, such as Radio Access Networks (RANs) based on Fifth Generation (5G). RANs configured for 5G operation use an air interface referred to as New Radio (NR). Spectrum-sharing between existing RANs and new RANs offers certain advantages but in the case of spectrum sharing between NR and Fourth Generation (4G) RANS using the Long Term Evolution (LTE) air interface, the implementation of spectrum-sharing arrangements is lacking, and substantially more work is needed.

SUMMARY

One or more embodiments of the present invention involve a first radio frequency (RF) carrier to span an RF spectrum that encompasses two or more other RF carriers. In particular, in one or more embodiments, the first RF carrier is a 5G NR carrier and the other RF carriers are 4G LTE carriers. The notion of bandwidth parts (BWPs) in the NR carrier may be used to enable spectrum sharing across a single NR carrier that spans more than one LTE carrier. This can be achieved by matching the allocation of the NR BWPs assigned to an NR User Equipment (UE) to align with one of the LTE carriers. The example using NR and LTE can involve an NR carrier spanning both contiguous and non-contiguous LTE carriers for various numerologies, e.g., for both 15 kHz NR subcarrier spacing as well as other subcarrier spacings including 30 and 60 kHz. The embodiments can be applied to both time division duplex (TDD) and frequency division duplex (FDD) implementations.

The embodiments described herein provide numerous advantages. For example, one or more of the embodiments allow multiple contiguous or non-contiguous LTE carriers to be shared, in terms of spectrum, across a single NR bandwidth using the framework for LTE/NR resource sharing defined in 3GPP Release 15. This spectrum sharing allows NR transmissions to employ wider bandwidths than would be achievable if LTE/NR sharing was supported only across a single LTE carrier. Furthermore, the solution described in the embodiments does not require any specialized signaling or interfaces between the NR gNB and the NR UEs that is not already defined in 3GPP Release 15. In addition, the ability to share NR transmissions across a wider bandwidth and over multiple LTE carriers supports greater flexibility for loading sharing and load balancing among LTE users and NR users.

According to some embodiments, a method of operation by a network node of a wireless communication network includes, for a first RF carrier (e.g., an NR carrier of a 5G RAN) spanning an RF spectrum that encompasses two or more other RF carriers (e.g., LTE carriers of a 4G RAN), determining a resource-usage pattern for control-related signaling conveyed on each of the other RF carriers and transmitting rate-matching information for each of two or more BWPs of the first RF carrier. Each BWP occupies RF spectrum used by a respective one of the other RF carriers, and the rate-matching information transmitted for each BWP is based on the resource-usage pattern determined for the respective other RF carrier. One advantage of this arrangement is that it allows rate matching to be performed by the NR radio network node(s) and NR wireless communication devices in each of the BWPs—i.e., rate matching is supported with respect to multiple LTE carriers.

According to some embodiments, a network node configured for operation in a wireless communication network includes communication circuitry and processing circuitry. The processing circuitry is configured to, for a first RF carrier spanning an RF spectrum that encompasses two or more other RF carriers, determine a resource-usage pattern for control-related signaling conveyed on each of the other RF carriers and transmit, via the communication circuitry, rate-matching information for each of two or more BWPs of the first RF carrier. Each BWP occupies RF spectrum used by a respective one of the other RF carriers, and the rate-matching information transmitted for each BWP is based on the resource-usage pattern determined for the respective other RF carrier. The resource-usage pattern for any given one of the other RF carriers defines, for example, the resources used by that other RF carrier for transmitting certain control signaling, such as any one or more of synchronization signals, cell reference signals, etc.

According to some embodiments, a method of operation by a network node of a wireless communication network includes, for a first RF carrier, configuring two or more BWPs. Each BWP is aligned (frequency-wise) with a respective one of two or more other RF carriers positioned within the RF spectrum spanned by the first RF carrier. The method also includes determining a frequency-sharing configuration for each BWP, in dependence on radio resource usage of the respective other RF carrier and configuring wireless communication devices to use respective ones of the BWPs. In an example implementation, the frequency-sharing configuration determined for each BWP of the first RF carrier accounts for radio-resource reservations (e.g., to avoid conflicting transmissions) and/or defines how the shared spectrum is "split" with respect to data transmissions.

According to some embodiments, a network node configured for operation in a wireless communication network includes communication circuitry and processing circuitry operatively associated with the communication circuitry. The processing circuitry is configured to, for a first RF carrier, configure two or more BWPs, each BWP aligned with a respective one of two or more other RF carriers positioned within the RF spectrum spanned by the first RF carrier. The processing circuitry is also configured to determine a frequency-sharing configuration for each BWP, in dependence on radio resource usage of the respective other RF carrier and configure wireless communication devices to use respective ones of the BWPs.

According to some embodiments, a method of operation by a wireless communication device operating in a wireless communication network includes receiving configuration information from a network node of the wireless communication network, configuring the wireless communication device for operation in a BWP of a first RF carrier, the BWP being a respective one of two or more BWPs defined within the first RF carrier. Each BWP is aligned with a respective one of two or more other RF carriers that are positioned within the RF spectrum spanned by the first RF carrier and operated in a spectrum-sharing arrangement with the first RF carrier. The method also includes operating with respect to the BWP according to the configuration information.

According to some embodiments, a wireless communication device configured for operation in a wireless communication network includes communication circuitry and processing circuitry. The processing circuitry is configured to receive, via the communication circuitry, configuration information from a network node of the wireless communication network, configuring the wireless communication device for operation in a BWP of a first RF carrier, the BWP being a respective one of two or more BWPs defined within the first RF carrier, each BWP aligned with a respective one of two or more other RF carriers that are positioned within the RF spectrum spanned by the first RF carrier and operated in a spectrum-sharing arrangement with the first RF carrier. The processing circuitry is also configured to operate the wireless communication device with respect to the BWP according to the configuration information.

Further aspects of the present invention are directed to an apparatus, network node, base station, wireless device, UE, network device, computer program products or computer-readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
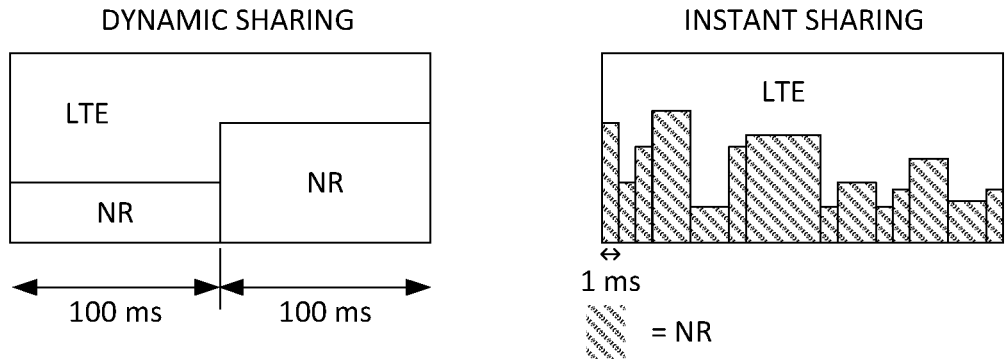
FIG. 1 is a diagram of an example of dynamic sharing of radio spectrum, as between Long Term Evolution (LTE) use and Fifth Generation (5G) New Radio (NR) use, and an example of instant sharing of radio spectrum, as between LTE use and 5G NR use.

Spectrum sharing allows operators to reuse existing Long Term Evolution (LTE) legacy spectrum for Fifth Generation (5G) New Radio (NR) services without the initial costs of acquiring new 5G NR spectrum or 5G radio and baseband hardware. In addition to sharing LTE and NR operation in a single band, operators have also expressed interest in sharing operation of an NR band spanning more than one LTE band.

The sharing of spectrum within a band between LTE and NR transmissions is made possible by flexible allocations of NR and LTE control channels and signals, as well as by rate matching around common reference signals (CRS) and synchronization signals, such as primary synchronization signals (PSS), secondary synchronization signals (SSS) and public broadcast channels (PBCH) signals that are always transmitted in an LTE carrier.

Rate matching is described in sections 5.1.4.1 and 5.1.4.2 in 3GPP TS 38.214 V15.3.0. Briefly, however, an example of rate matching involves a resource block (RB) to be used for a transmission on a first RF carrier, where the RB resides in spectrum shared by another RF carrier and one or more resource elements (REs) within the block are reserved for use by the other RF carrier. The entity using the RB for transmitting on the first RF carrier uses non-reserved REs within the RB for its transmission and adapts its information-coding rate to "fit" the transmission into the non-reserved REs. Here, the REs comprise, for example, time/frequency resources within a time-frequency resource grid, such as is defined by Orthogonal Frequency Division Multiplexing (OFDM) carrier.

In a spectrum-sharing example between an NR carrier and an LTE carrier, rate matching on the NR side allows an NR transmitter to use available portions of RBs that are partially allocated for LTE use. The less efficient alternative is for the NR transmitter to forego any use of the available REs within the RB. In an advantageous embodiment herein, an NR carrier is "configured" (logically structured) to include multiple BWPs, with each BWP aligned to a respective one of multiple LTE carriers that reside within the RF spectrum spanned by the NR carrier. An entity in the NR determines a resource-usage pattern for each of the LTE carriers, e.g., the subframes/RBs used by each LTE carrier for the repetitive transmission of key control signaling such as downlink synchronization signals, cell reference signals, etc. Such information is then used on the NR side to enable DL and/or UL rate matching by the NR radio network node(s) and NR wireless communication devices that are operating within each of the BWPs of the NR carrier.

Such embodiments, therefore, provide for rate matching with respect to multiple LTE carriers that are overlapped in frequency by an NR carrier. Moreover, rate matching is provided for irrespective of whether the LTE carriers are contiguous in frequency or non-contiguous in frequency.

In more detail, it is possible to define patterns in the time/frequency domain that repeat with a certain periodicity—e.g., patterns of resource usage by an LTE carrier for key control signaling that is transmitted periodically on the LTE carrier. General patterns are block-based and defined by two bitmaps; namely, a frequency domain bitmap with a granularity of one resource block (RB) and a time domain bitmap with a granularity of one orthogonal frequency division multiplex (OFDM) symbol. Employing this mechanism, entities operating in an NR ran sharing spectrum with LTE carriers can rate match with respect to control signals (e.g., LTE PSS/SSS).

The spectrum sharing configurations employed between NR and LTE transmissions can be implemented on a static frequency division multiplex (FDM) or time division multiplex (TDM) basis, as well as dynamic or instantaneous sharing on a TDM basis. This sharing is shown in FIG. 1.

Existent 3GPP NR standards do not provide support for spectrum sharing for multiple LTE carriers. Particularly, the existing NR standards do not contemplate or otherwise provide for signaling to NR UEs for LTE CRS rate matching when multiple LTE carriers are overlapped by the NR carrier.

Figure 2:
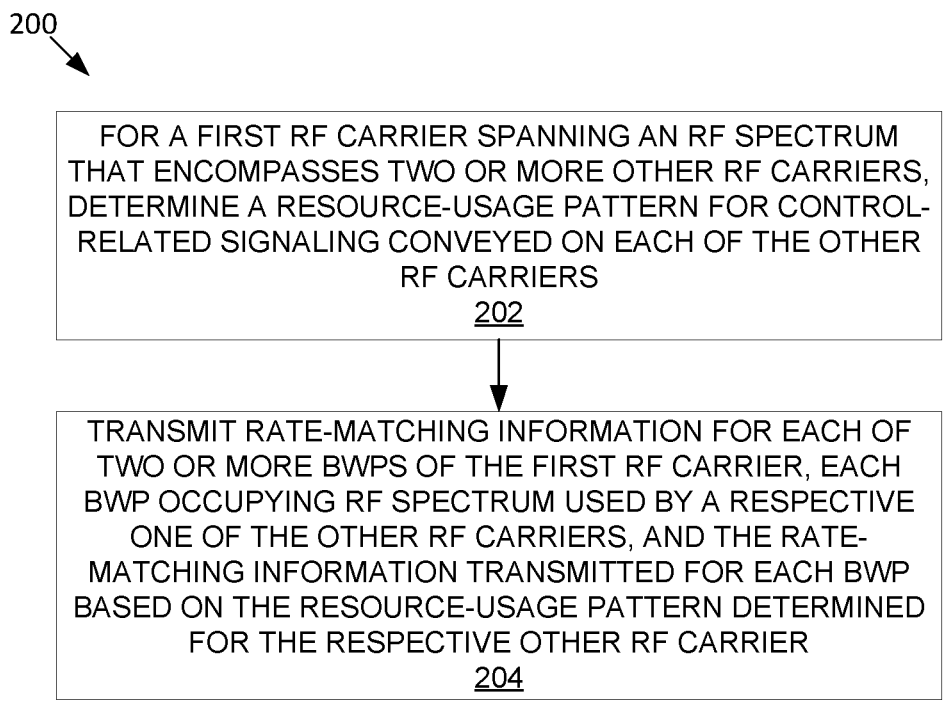
FIG. 2 is a logic flow diagram of one embodiment of a method of operation by a network node.

FIG. 2 depicts a method 200 of operation by a network node of a wireless communication network, in accordance with particular embodiments. The method 200 includes, for a first RF carrier spanning an RF spectrum that encompasses two or more other RF carriers, determining a resource-usage pattern for control-related signaling conveyed on each of the other RF carriers (block 202). The method 200 also includes transmitting rate-matching information for each of two or more BWPs of the first RF carrier (block 204). Each BWP occupies RF spectrum used by a respective one of the other RF carriers, and the rate-matching information transmitted for each BWP is based on the resource-usage pattern determined for the respective other RF carrier.

The network node may be a radio network node configured as a 5G Radio Access Network (RAN) node, where the first RF carrier is an NR carrier of the 5G RAN operated in a spectrum-sharing arrangement with two or more LTE carriers, as the two or more other RF carriers. The radio network node may determine the resource-usage pattern for control-related signaling conveyed on each of the LTE carriers based on communicating with another radio network entity having knowledge of the LTE carriers.

In an example embodiment, a radio base station includes an NR part and an LTE part, with local communication interface therebetween that provides for the exchange of spectrum-sharing information between the two parts—e.g., the exchange of scheduling information between the resource scheduler managing resources on the NR carrier and the resource scheduler(s) managing resources on the LTE carriers overlapped by the NR carrier. Such an interface may be high-speed and, therefore, facilitate highly dynamic spectrum-sharing where the resource usage in the shared (overlapped) portions of the NR spectrum are rapidly adjusted as between NR use and LTE use, in view of, e.g., traffic loading in the respective RANs.

More broadly, an NR radio network node and an LTE radio network node may be co-located and may have a local interface between them for exchanging spectrum-sharing information. Of course, the various spectrum-sharing techniques and operations disclosed herein may also apply to non-co-located radio network nodes—e.g., cases where the NR radio network node scheduling resources on an NR carrier are not co-located with the LTE radio network node(s) scheduling resources on the LTE carriers overlapped by the NR carrier. One mechanism for accommodating slower or higher-overhead interfaces between the NR and LTE sides of the spectrum-sharing arrangement is to extend the unit interval over which spectrum-sharing configurations are used. For example, spectrum-sharing configurations can be decided for intervals of 100 milliseconds (ms) rather than for intervals of 1 ms. Of course, those numbers are merely non-limiting examples. Spectrum-sharing may be decided on longer or shorter intervals, such as 1 second intervals, or even longer, in dependence on the mechanism available for exchanging resource-usage information between the LTE and NR sides of the spectrum-sharing arrangement.

In some embodiments, a radio network node associated with a first RF carrier that overlaps two or more other RF carriers configures BWPs of the first RF carrier such that each BWP aligns with a respective one of the other RF carriers. Correspondingly, the radio network node configures wireless communication devices to use respective ones of the BWPs and transmits the rate-matching information for each BWP to the wireless communication devices configured to use the BWP.

Figure 3:
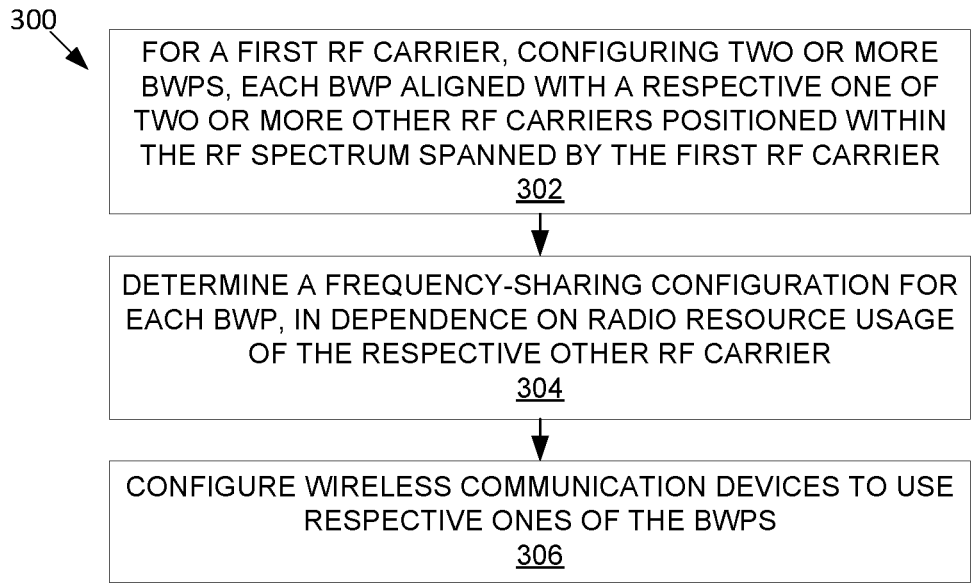
FIG. 3 is a logic flow diagram of another embodiment of a method of operation by a network node.

FIG. 3 depicts another method 300 of operation by a network node of a wireless communication network, in accordance with other particular embodiments. The method 300 includes, for a first RF carrier, configuring two or more BWPs (block 302). Each BWP is aligned with a respective one of two or more other RF carriers positioned within the RF spectrum spanned by the first RF carrier. The method also includes determining a frequency-sharing configuration for each BWP, in dependence on radio resource usage of the respective other RF carrier (block 304) and configuring wireless communication devices to use respective ones of the BWPs (block 306).

Determining the frequency-sharing configuration for each BWP may include obtaining at least one of resource-usage patterns and resource scheduling information from a network entity associated with the respective other RF carrier. For each BWP, the network node may obtain a resource-usage pattern associated with the respective other RF carrier, and the method may further include reserving the radio resources identified in the resource-usage pattern, to avoid conflicting use of the radio resources with respect to downlink or uplink transmissions on the first RF carrier. Configuring the wireless communication devices to use respective ones of the BWPs includes, for the one or more wireless devices configured to use a particular BWP, may include sending an indication of the resource-usage pattern, thereby enabling the wireless devices to use, or account for, rate matching around radio resource elements reserved according to the resource-usage pattern.

In some embodiments, for each BWP, the network node may obtain or cooperatively determine how the bandwidth shared by the BWP and the respective other RF carrier is to be shared, at least for data transmissions. Determining the frequency-sharing configuration for each BWP may include cooperatively determining the frequency-sharing configuration, based on communicating with a network entity associated with the respective other RF carrier. The determinations may be made on a recurring basis, e.g., with respect to defined intervals of, e.g., 1 millisecond or 100 milliseconds. If the network node has ready access to the network entity or entities responsible for scheduling radio resources in the other RF carriers, making the sharing arrangement more dynamic—shorter intervals over which a given sharing arrangement is maintained—may be advantageous.

Configuring the wireless communication devices to use respective ones of the BWPs may include assigning a particular one or ones of the wireless communication devices to a particular BWP, in dependence on a traffic loading of the respective other RF carrier, a traffic loading of the particular BWP, differences in traffic loading across the other RF carriers and/or differences in traffic loading across the BWPs.

In some embodiments, the wireless communication devices may be operating on the first RF carrier or are to be operated on the first RF carrier. The first RF carrier is a 5G NR carrier and the other RF carriers are 4G LTE carriers, where the network node is a 5G radio network node that provides the first RF carrier, and where one or more 4G radio network nodes, integrated with or implemented apart from the 5G radio network node, provide the LTE carriers. The other RF carriers may be contiguous in frequency, and, correspondingly, the BWPs may be contiguous in frequency. In further embodiments, at least two of the other RF carriers are not contiguous in frequency and, likewise, the corresponding BWPs are not contiguous in frequency.

In some embodiments, a numerology used for the first RF carrier within at least one of the BWPs may differ from a numerology used by the respective other RF carrier.

Figure 4:
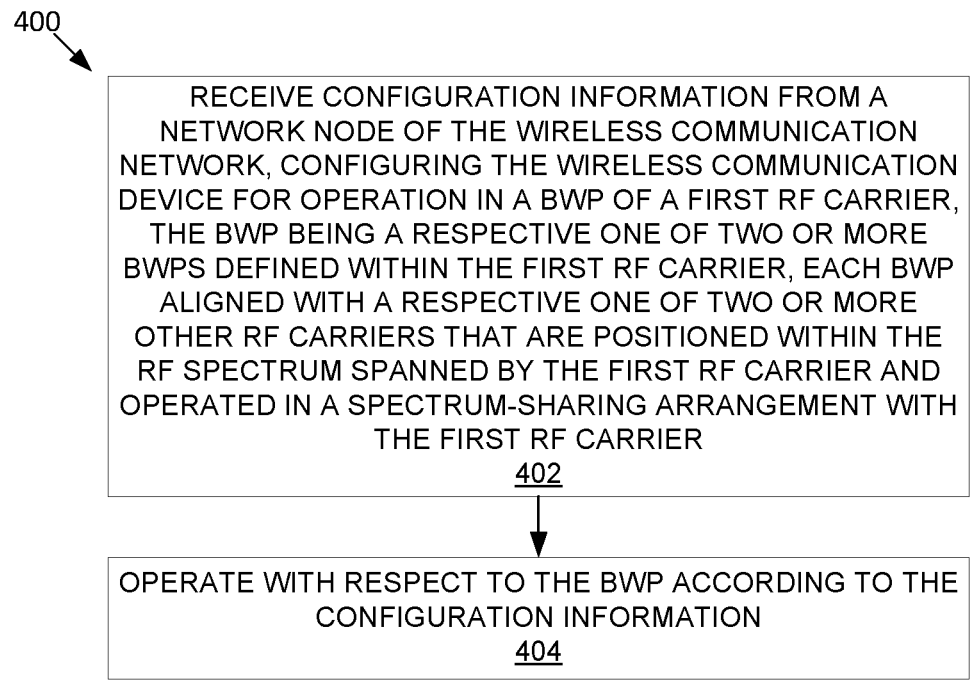
FIG. 4 is a logic flow diagram of one embodiment of a method of operation by a wireless device, also referred to as a user equipment or UE.

FIG. 4 depicts a method 400 of operation by a wireless communication device operating in a wireless communication network. The method 400 includes receiving configuration information from a network node of the wireless communication network, configuring the wireless communication device for operation in a BWP of a first RF carrier, the BWP being a respective one of two or more BWPs defined within the first RF carrier (block 402). Each BWP is aligned with a respective one of two or more other RF carriers that are positioned within the RF spectrum spanned by the first RF carrier and operated in a spectrum-sharing arrangement with the first RF carrier. The method also includes operating with respect to the BWP according to the configuration information (block 404).

The configuration information may include rate-matching information and operating with respect to the BWP part according to the configuration information may include performing rate matching for uplink data transmissions or accounting for rate matching in downlink data transmission, in accordance with the rate matching information. The configuration information may indicate reserved resources that are not used by the first RF carrier within the BWP, and the operating with respect to the BWP according to the configuration information may include ignoring or otherwise not using the reserved resources with respect to transmission or reception operations at the wireless communication device.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
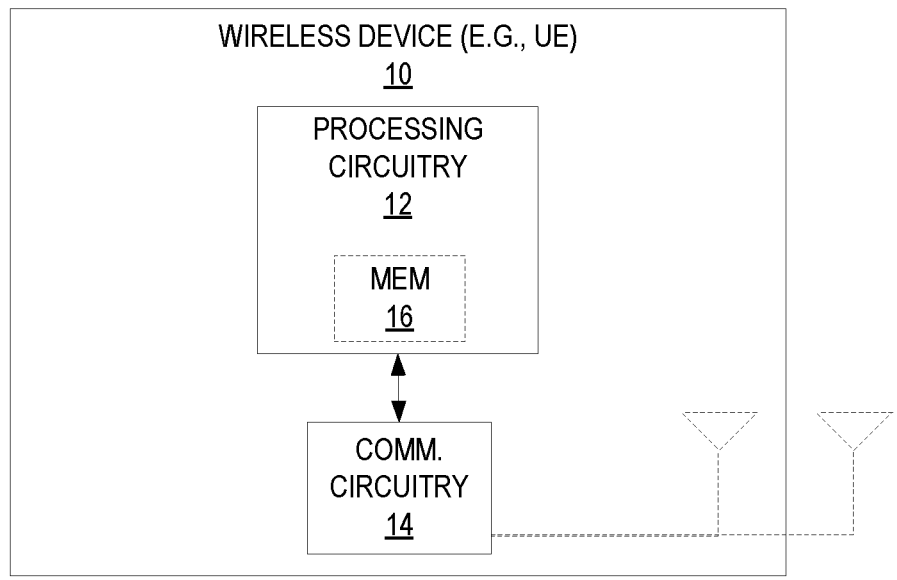
FIG. 5 is a block diagram of one embodiment of a wireless device.

FIG. 5, for example, illustrates a wireless device 10 as implemented in accordance with one or more embodiments. As shown, the wireless device 10 includes processing circuitry 12 and communication circuitry 14. The communication circuitry 14 (e.g., radio circuitry) is configured to transmit and/or receive information to and/or from one or more other nodes, e.g., via any communication technology. Such communication may occur via one or more antennas that are either internal or external to the wireless device 10. The processing circuitry 10 is configured to perform the processing described above for a wireless device in FIG. 4, for example, such as by executing instructions stored in memory 16.

The processing circuitry 12 in this regard may implement certain functional means, units, or modules. For example, a functional implementation may include a receiving module for receiving configuration information from a network node of the wireless communication network, configuring the wireless communication device for operation in a BWP of a first RF carrier, the BWP being a respective one of two or more BWPs defined within the first RF carrier, each BWP aligned with a respective one of two or more other RF carriers that are positioned within the RF spectrum spanned by the first RF carrier and operated in a spectrum-sharing arrangement with the first RF carrier. The implementation may also include an operating module for operating with respect to the BWP according to the configuration information.

Figure 6:
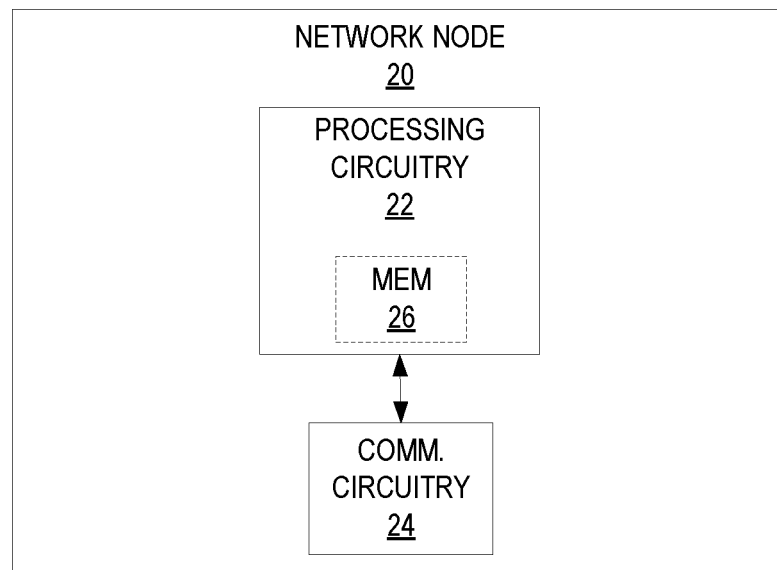
FIG. 6 is a block diagram of one embodiment of a network node.

FIG. 6 illustrates a network node 20 as implemented in accordance with one or more embodiments. As shown, the network node 20 includes processing circuitry 22 and communication circuitry 24. The communication circuitry 24 is configured to transmit and/or receive information to and/or from one or more other nodes, e.g., via any communication technology. The processing circuitry 22 is configured to perform the processing described above for the network node (e.g., FIGS. 2 and 3), such as by executing instructions stored in memory 26.

The processing circuitry 22 in this regard may implement certain functional means, units, or modules. For example, a functional implementation may include a determining module for, for a first RF carrier spanning an RF spectrum that encompasses two or more other RF carriers, determining a resource-usage pattern for control-related signaling conveyed on each of the other RF carriers. The implementation may include a transmitting module for transmitting rate-matching information for each of two or more BWPs of the first RF carrier, each BWP occupying RF spectrum used by a respective one of the other RF carriers, and the rate-matching information transmitted for each BWP based on the resource-usage pattern determined for the respective other RF carrier.

Another example functional implementation may include a configuring module for, for a first RF carrier, configuring two or more BWPs, each BWP aligned with a respective one of two or more other RF carriers positioned within the RF spectrum spanned by the first RF carrier. The implementation may include a determining module for determining a frequency-sharing configuration for each BWP, in dependence on radio resource usage of the respective other RF carrier. The configuring module is also for configuring wireless communication devices to use respective ones of the BWPs.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium. In this regard, embodiments herein also include a computer program product stored on a non-transitory computer-readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Embodiment #1

Figure 7:
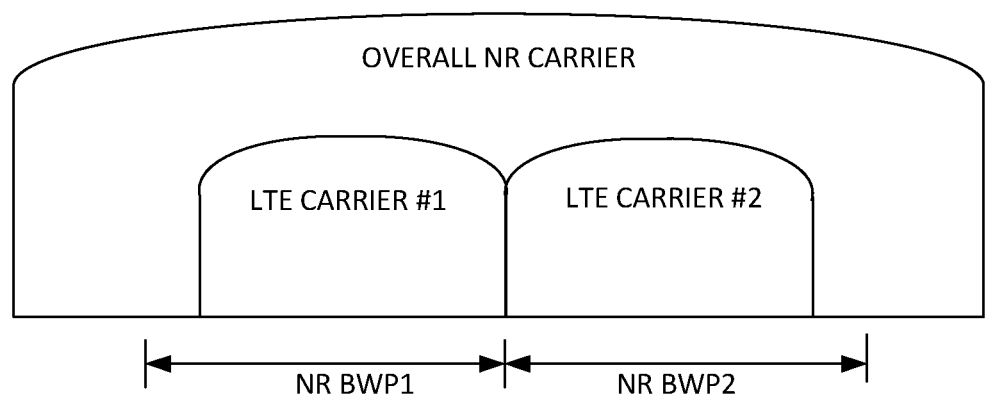
FIGS. 7 and 8 are diagrams of example NR Bandwidth Parts (BWP) of an overall NR carrier, where the NR carrier overlaps one or more LTE carriers.

According to a first embodiment, radio frequency (RF) spectrum is shared between a single NR carrier of total bandwidth (BWNR) and two or more LTE carriers contiguously spanning the bandwidth BWNR. For example, consider two LTE carriers of bandwidths BWLTE1 and BWLTE2 such that BWLTE1+BWLTE2 spans part of or all of the BWNR—i.e., the combined contiguous bandwidth BWLTE1 and BWLTE2 can be a subset, equal to, or a superset of the NR bandwidth BWNR. It should be noted that the combined bandwidths of the LTE carriers may be less than BWNR since the NR band will have additional resource blocks (RBs) at the band edge that are not available to the LTE carriers. For this example, UEs in the serving NR cell would be assigned to one of two BWPs that correspond to the frequency assignments for the LTE carrier 1 or the LTE carrier 2. This is illustrated in FIG. 7, which illustrates a mapping of NR bandwidth parts to contiguous LTE carriers. For each BWP, the NR UEs assigned to that BWP would share the spectrum with the legacy LTE UEs in the carrier corresponding to the given BWP (BWP #1 with carrier #1 and BWP #2 with carrier #2). For this embodiment, it is assumed that the NR transmissions employ a 15 kHz sub-carrier spacing, aligned with the 15 kHz sub-carrier spacing employed in LTE transmissions.

For each BWP and its associated LTE carrier, an NR/LTE spectrum sharing configuration can be defined based on the notion of reserved resources defined in 3GPP TS38.211 v15.3.0 and 3GPP TS38.214. With this approach, it is possible to overlay an NR carrier in the same spectrum as an LTE carrier. This is made possible by flexibly assigning the LTE and NR locations of control channels and signals and by rate matching around common reference signals (CRS) and synchronization signals (PSS, SSS, PBCH) that are always transmitted in an LTE carrier. The rate matching information is provided per BWP.

With regard to NR/LTE spectrum sharing between two or more LTE carriers and a single NR band, it was noted that in TS38.214, it is specified that only a single pattern of LTE CRS rate matching is defined per LTE carrier of 10 or 20 MHz. Thus, a separate LTE CRS rate matching message needs to be sent for each LTE carrier/BWP pairing—i.e., the LTE CRS rate matching may be different for different BWPs, which is not currently supported in Release 15 of the 3GPP standard (see Embodiment #4 below). As such the LTE CRS rate matching pattern can be applied to one of the NR UE BWPs (e.g., the 1st BWP with CRS rate matching to the 1st LTE carrier), whereas the second BWP will have to employ reserved resources to avoid collisions with the CRS of the second LTE carrier. Note that this approach will result in completely blocking symbols containing CRS within an RB for that BWP.

One such NR configuration that can be overlaid on an LTE carrier comprises a Type 1 Single symbol DMRS configuration with the first DMRS symbol on symbol 2 or 3 (symbol counting is assumed to start at 0) and a second DMRS symbol on symbol 11. NR synchronization signal block (SSB) transmissions may be allocated in a slot overlapping an LTE multicast broadcast single frequency network (MBSFN) subframe to avoid overlap with LTE CRS. An NR tracking reference signal (TRS) may be allocated in symbols 5 and 9 in slots avoiding LTE subframes with PSS/SSS, or alternatively, TRS may be employed in a slot overlapping an LTE MBSFN subframe to avoid impact on LTE transmissions. Note that the TRS may span the UE BWP or 52 resource blocks, whatever is smaller. CSI-RS allocated may be allocated in symbols 5 (not in a slot overlapping the PSS/SSS subframes or SSB slots), 6 (not in a slot overlapping PSS/SSS subframes or TRS slots), 10 (not in TRS slots), 12 and 13. Also, CSI-RS may be placed in a slot overlapping an LTE MBSFN subframe. Rate matching patterns may be configured to avoid LTE PSS/SSS and PBCH and potentially also LTE CSI-RS.

A second possible NR configuration that can be overlaid on an LTE carrier includes a Type 2 demodulation reference signal (DMRS). To coexist with LTE CRS, DMRS (and thus the physical downlink shared channel, PDSCH) can only be scheduled (for one user) below or above LTE DC subcarrier. Furthermore, a Type 2 DMRS code-division multiplexing (CDM) group that coexists on one side of the LTE DC subcarrier with LTE CRS will collide in the other half—i.e., only a single CDM group (out of 3) does not collide with CRS in one spectrum half. NR SSB transmissions may be allocated in a slot overlapping an LTE MBSFN subframe to avoid overlap with LTE CRS. For PDSCH transmissions to coexist with LTE, PDSCH can only be scheduled (for one user) below or above LTE DC subcarrier with PDSCH allocated from symbol 3 to 13 (symbol counting is assumed to start at 0). TRS may be in symbols 5 and 9, or in slots avoiding LTE subframes with PSS/SSS and NR slots with SSB. Note that the TRS will span the UE BWP or 52 resource blocks, whatever is smaller. CSI-RS may be in symbols 5 (not in a slot overlapping PSS/SSS subframes, or TRS slots), 6 (not in a slot overlapping PSS/SSS subframes), 9 (not in TRS slots), 12 and 13. Also, CSI-RS can be placed in a slot overlapping an LTE MBSFN subframe. Rate matching patterns may be configured to avoid LTE PSS/SSS and the public broadcast channel (PBCH) and potentially also LTE CSI-RS.

Without a loss of generality, other NR configurations may be defined for spectrum sharing with LTE consistent with the reserved resource framework defined in 3GPP TS38.211 v15.3.0 and 3GPP TS38.214. Furthermore, the spectrum sharing configurations that are assigned within an NR carrier to different BWPs aligned with LTE carrier allocations may be the same or different.

For embodiments described herein, NR UEs can support up to 4 BWP configurations and will have a default BWP configuration. If NR is supported by a carrier that only partially overlaps the LTE carriers, and there is a BWP defined for the portion of the NR carrier that does not overlap, it may be assumed that the default BWP corresponds to the BWP in the non-overlapping portion of the NR carrier. If no such BWP exists or if the NR carrier fully overlaps the LTE carriers, then it may be assumed that the default BWP for an NR UE corresponds to a BWP that fully or partially overlaps with one of the LTE carrier bandwidth allocations. It may be assumed that the default BWP will have an SSB allocation; however, for a given NR UE, other BWP configurations are possible that do not require an SSB allocation. For scenarios in which BWPs do not have an SSB allocation, measurements may be supported through the use of CSI-RS and TRS.

The pairing of a given BWP with a specific NR UE by the gNB scheduler may be based on a number of factors including the traffic loading of the LTE carrier, the traffic loading in the specific NR BWP and the load balancing between the LTE carriers. The rate matching patterns required for each NR BWP may be communicated by the network in separate (LTE) rate matching messages to the NR UEs supporting the BWPs aligned with the LTE carriers.

The spectrum sharing configurations employed between NR UEs in a given BWP and legacy LTE UEs served by the corresponding LTE carrier may be implemented for both FDD and TDD carriers, on a static frequency division multiplex (FDM) or time division multiplex (TDM) basis, as well as dynamic or instantaneous TDM sharing basis through use of reserved resources as defined in 3GPP TS 38.211 and 3GPP TS 38.214. It may be assumed that spectrum sharing configuration can be implemented with a resolution of a subframe (i.e., 1 ms in LTE or NR).

Without a loss of generality, embodiments may also be applied to network solutions supporting both NR standalone (SA) and NR non-standalone (NSA) architectures. Furthermore, the embodiments may apply to single NR carriers spanning a multiplicity of LTE carriers, or NR carriers configured as either primary cells (PCells) or secondary cells (SCells) in an architecture supporting NR-NR carrier aggregation (CA).

Embodiment #2

Figure 8:
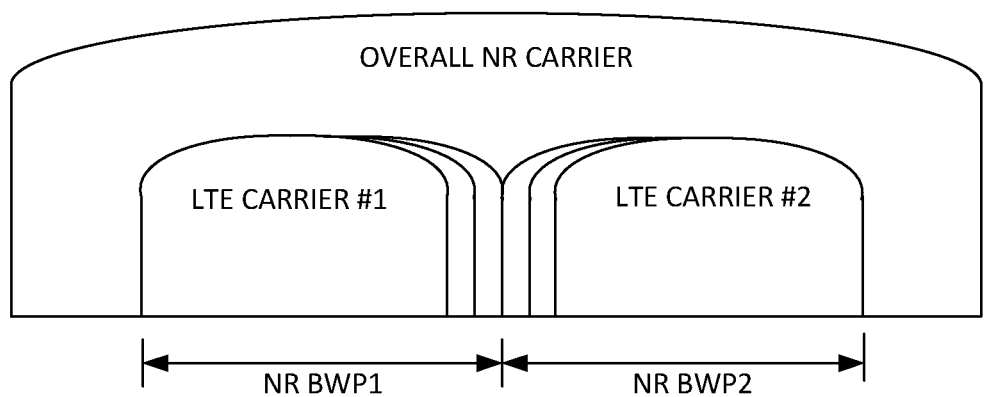

A second embodiment may be considered an extension of the first embodiment to a multiplicity of LTE carriers within the total NR bandwidth, such that one or more of the LTE carriers may not be contiguous with each other. This is illustrated in FIG. 8, which illustrates a mapping of NR BWPs to non-contiguous LTE carriers, for the case of two LTE carriers. For such a configuration, the BWPs for the NR transmissions may be configured with overlapping and non-overlapping components of the LTE bands. The non-overlapping component of the BWP may be exploited to minimize the overhead between reserved NR resources and LTE PDSCH transmissions. For example, NR physical downlink control channel (PDCCH) and PDSCH may be allocated in the non-overlapping region without the need to reserve resources for LTE control or RS transmissions.

As in the first embodiment, rate matching patterns may need to be configured to avoid LTE PSS/SSS and PBCH and potentially also LTE CSI-RS in the overlap regions of the NR BWP with the LTE carriers. Using the bitmap pattern specifying the physical resource blocks (PRBs) in the frequency domain, the PRBs in the overlap region may be reserved to avoid collisions between the LTE PSS/SS/PBCH transmissions and any NR transmissions.

Embodiment #3

A third embodiment may be considered an extension of the first and second embodiments to a multiplicity of LTE carriers within the total NR bandwidth, such that one or more the BWPs at least partially overlapped with the LTE carriers employs a different numerology than the LTE carrier with which it is aligned (i.e., a subcarrier spacing other than 15 kHz).

Embodiment #4

According to a fourth embodiment, in NR Release 15, all rate matching patterns are defined per BWP except the LTE CRS rate matching, which is defined for the NR carrier. The LTE CRS rate matching per BWP may also be defined. Note, this embodiment would require standard updates that are not required by the first and third embodiments.

The embodiments described herein are advantageous in that they support wider NR bandwidths in an NR/LTE spectrum sharing configuration than would be achievable when implementing NR/LTE spectrum sharing with a single LTE legacy carrier. Furthermore, the solution may be achieved within the existing 3GPP Release 15 NR/LTE resource sharing framework, and by employing the existing signaling between the gNB and NR UEs, as defined in 3GPP Release 15.

Figure 9:
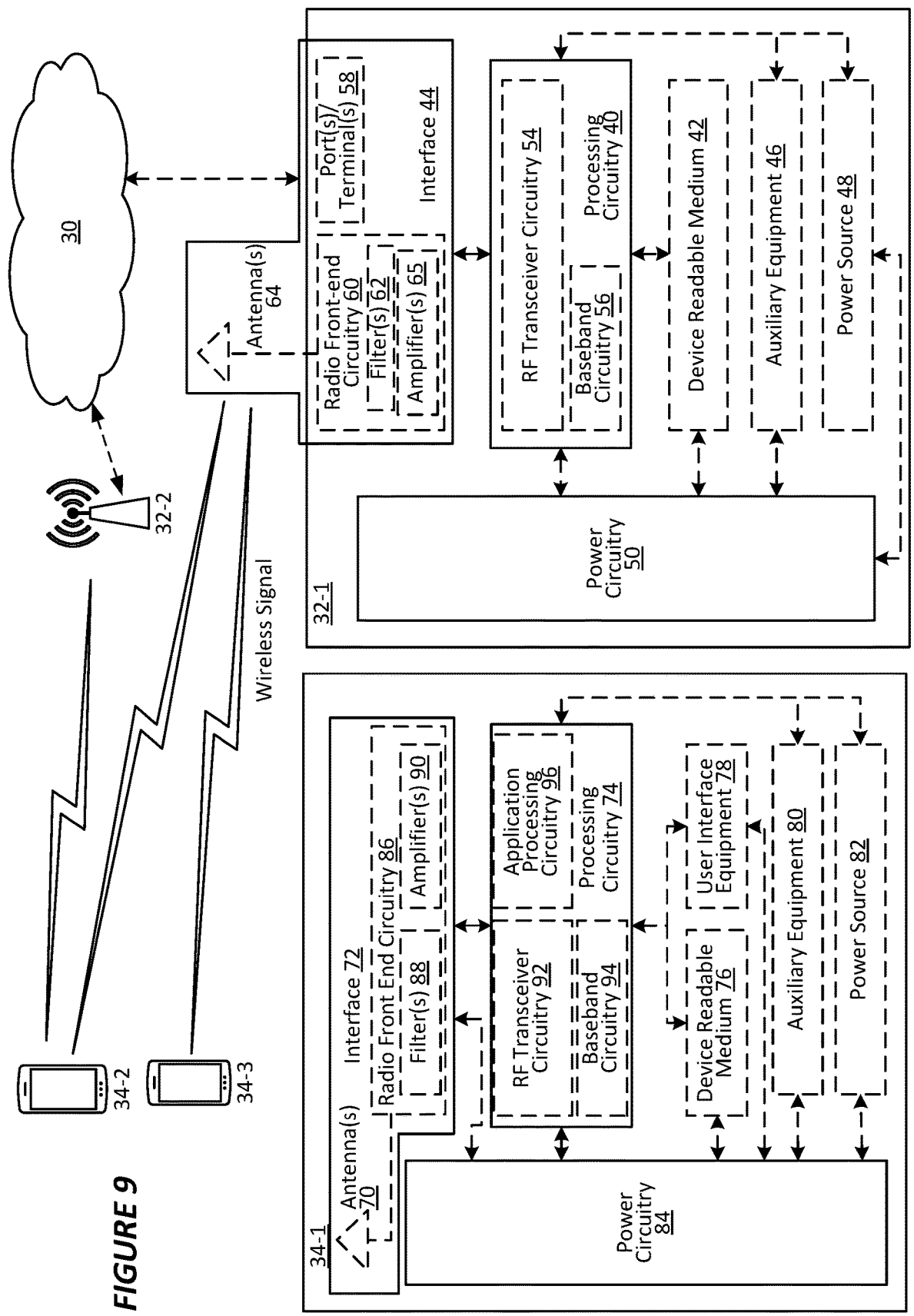
FIG. 9 is a block diagram of one embodiment of a telecommunication network, including an example of a network node and an example of a wireless device.

Although the subject matter described herein may be implemented in any appropriate type of system using any suitable components, the embodiments disclosed herein are described in relation to a telecommunication network, also referred to as a wireless communication network. FIG. 9 depicts a wireless communication network 30 that includes network nodes 32-1 and 32-2 and provides communication services to any number of wireless devices, e.g., WDs 34-1, 34-2, and 34-3. In practice, the network 30 may further include any additional elements suitable to support communication between wireless devices or between a wireless device and another communication device, such as a landline telephone, a service provider, or any other network node or end device. Of the illustrated components, network node 32-1 and WD 34-1 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or another similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 30 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 32-1 and WD 34-1 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 32-1 includes processing circuitry 40, device readable medium 42, interface 44, auxiliary equipment 46, power source 48, power circuitry 50, and antenna 64. Although network node 32-1 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 32-1 are depicted as single boxes located within a larger box, or nested within multiple boxes, in practice, a network node may comprise multiple different physical components that make up a single illustrated component (e.g., device readable medium 42 may comprise multiple separate hard drives as well as multiple RAM modules).

Similarly, network node 32-1 may be composed of multiple physically separate components (e.g., a NodeB component and a RNC component, or a BTS component and a BSC component, etc.), which may each have their own respective components. In certain scenarios in which network node 32-1 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 32-1 may be configured to support multiple radio access technologies (RATs). In such embodiments, some components may be duplicated (e.g., separate device readable medium 42 for the different RATs) and some components may be reused (e.g., the same antenna 64 may be shared by the RATs). Network node 32-1 may also include multiple sets of the various illustrated components for different wireless technologies integrated into network node 32-1, such as, for example, GSM, WCDMA, LTE, NR, Wi-Fi, or Bluetooth wireless technologies. These wireless technologies may be integrated into the same or different chip or set of chips and other components within network node 32-1.

Processing circuitry 40 is configured to perform any determining, calculating, or similar operations (e.g., certain obtaining operations) described herein as being provided by a network node. These operations performed by processing circuitry 40 may include processing information obtained by processing circuitry 40 by, for example, converting the obtained information into other information, comparing the obtained information or converted information to information stored in the network node, and/or performing one or more operations based on the obtained information or converted information, and as a result of said processing making a determination.

Processing circuitry 40 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 32-1 components, such as device readable medium 42, network node 32-1 functionality. For example, processing circuitry 40 may execute instructions stored in device readable medium 42 or in memory within processing circuitry 40. Such functionality may include providing any of the various wireless features, functions, or benefits discussed herein. In some embodiments, processing circuitry 40 may include a system on a chip (SOC).

In some embodiments, processing circuitry 40 may include one or more of radio frequency (RF) transceiver circuitry 54 and baseband processing circuitry 56. In some embodiments, radio frequency (RF) transceiver circuitry 54 and baseband processing circuitry 56 may be on separate chips (or sets of chips), boards, or units, such as radio units and digital units. In alternative embodiments, part or all of RF transceiver circuitry 54 and baseband processing circuitry 56 may be on the same chip or set of chips, boards, or units.

In certain embodiments, some or all of the functionality described herein as being provided by a network node, base station, eNB or other such network device may be performed by processing circuitry 40 executing instructions stored on device readable medium 42 or memory within processing circuitry 40. In alternative embodiments, some or all of the functionality may be provided by processing circuitry 40 without executing instructions stored on a separate or discrete device readable medium, such as in a hard-wired manner. In any of those embodiments, whether executing instructions stored on a device readable storage medium or not, processing circuitry 40 can be configured to perform the described functionality. The benefits provided by such functionality are not limited to processing circuitry 40 alone or to other components of network node 32-1 but are enjoyed by network node 32-1 as a whole, and/or by end users and the wireless network generally.

Device readable medium 42 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 40. Device readable medium 42 may store any suitable instructions, data or information, including a computer program, software, an application including one or more of logic, rules, code, tables, etc. and/or other instructions capable of being executed by processing circuitry 40 and, utilized by network node 32-1. Device readable medium 42 may be used to store any calculations made by processing circuitry 40 and/or any data received via interface 44. In some embodiments, processing circuitry 40 and device readable medium 42 may be considered to be integrated.

Interface 44 is used in the wired or wireless communication of signaling and/or data between network node 32-1, network 30, and/or WDs 34-1. As illustrated, interface 44 comprises port(s)/terminal(s) 58 to send and receive data, for example to and from network 30 over a wired connection. Interface 44 also includes radio front-end circuitry 60 that may be coupled to, or in certain embodiments a part of, antenna 64. Radio front-end circuitry 60 comprises filters 62 and amplifiers 65. Radio front-end circuitry 60 may be connected to antenna 64 and processing circuitry 40. Radio front-end circuitry may be configured to condition signals communicated between antenna 64 and processing circuitry 40. Radio front-end circuitry 60 may receive digital data that is to be sent out to other network nodes or WDs via a wireless connection. Radio front-end circuitry 60 may convert the digital data into a radio signal having the appropriate channel and bandwidth parameters using a combination of filters 62 and/or amplifiers 65. The radio signal may then be transmitted via antenna 64. Similarly, when receiving data, antenna 64 may collect radio signals which are then converted into digital data by radio front-end circuitry 60. The digital data may be passed to processing circuitry 40. In other embodiments, the interface may comprise different components and/or different combinations of components.

In certain alternative embodiments, network node 32-1 may not include separate radio front-end circuitry 60; instead, processing circuitry 40 may comprise radio front-end circuitry 60 and may be connected to antenna 64 without separate radio front-end circuitry 60. Similarly, in some embodiments, all or some of RF transceiver circuitry 54 may be considered a part of interface 44. In still other embodiments, interface 44 may include one or more ports or terminals 58, radio front-end circuitry 60, and RF transceiver circuitry 54, as part of a radio unit (not shown), and interface 44 may communicate with baseband processing circuitry 56, which is part of a digital unit (not shown).

Antenna 64 may include one or more antennas, or antenna arrays, configured to send and/or receive wireless signals. Antenna 64 may be coupled to radio front-end circuitry 60 and may be any type of antenna capable of transmitting and receiving data and/or signals wirelessly. In some embodiments, antenna 64 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 64 may be separate from network node 32-1 and may be connectable to network node 32-1 through an interface or port.

Antenna 64, interface 44, and/or processing circuitry 40 may be configured to perform any receiving operations and/or certain obtaining operations described herein as being performed by a network node. Any information, data and/or signals may be received from a wireless device, another network node and/or any other network equipment. Similarly, antenna 64, interface 44, and/or processing circuitry 40 may be configured to perform any transmitting operations described herein as being performed by a network node. Any information, data and/or signals may be transmitted to a wireless device, another network node and/or any other network equipment.

Power circuitry 50 may comprise, or be coupled to, power management circuitry and is configured to supply the components of network node 32-1 with power for performing the functionality described herein. Power circuitry 50 may receive power from power source 48. Power source 48 and/or power circuitry 50 may be configured to provide power to the various components of network node 32-1 in a form suitable for the respective components (e.g., at a voltage and current level needed for each respective component). Power source 48 may either be included in, or external to, power circuitry 50 and/or network node 32-1. For example, network node 32-1 may be connectable to an external power source (e.g., an electricity outlet) via an input circuitry or interface such as an electrical cable, whereby the external power source supplies power to power circuitry 50. As a further example, power source 48 may comprise a source of power in the form of a battery or battery pack which is connected to, or integrated in, power circuitry 50. The battery may provide backup power should the external power source fail. Other types of power sources, such as photovoltaic devices, may also be used.

Alternative embodiments of network node 32-1 may include additional components beyond those shown in FIG.

9 that may be responsible for providing certain aspects of the network node's functionality, including any of the functionality described herein and/or any functionality necessary to support the subject matter described herein. For example, network node 32-1 may include user interface equipment to allow input of information into network node 32-1 and to allow output of information from network node 32-1. This may allow a user to perform diagnostic, maintenance, repair, and other administrative functions for network node 32-1.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 34-1 includes antenna 70, interface 72, processing circuitry 74, device readable medium 76, user interface equipment 78, auxiliary equipment 80, power source 82 and power circuitry 84. WD 34-1 may include multiple sets of one or more of the illustrated components for different wireless technologies supported by WD 34-1, such as, for example, GSM, WCDMA, LTE, NR, Wi-Fi, WiMAX, NB-IoT, or Bluetooth wireless technologies, just to mention a few. These wireless technologies may be integrated into the same or different chips or set of chips as other components within WD 34-1.

Antenna 70 may include one or more antennas or antenna arrays, configured to send and/or receive wireless signals, and is connected to interface 72. In certain alternative embodiments, antenna 70 may be separate from WD 34-1 and be connectable to WD 34-1 through an interface or port. Antenna 70, interface 72, and/or processing circuitry 74 may be configured to perform any receiving or transmitting operations described herein as being performed by a WD. Any information, data and/or signals may be received from a network node and/or another WD. In some embodiments, radio front end circuitry and/or antenna 70 may be considered an interface.

As illustrated, interface 72 comprises radio front end circuitry 86 and antenna 70. Radio front end circuitry 86 comprises one or more filters 88 and amplifiers 90. Radio front end circuitry 86 is connected to antenna 70 and processing circuitry 74 and is configured to condition signals communicated between antenna 70 and processing circuitry 74. Radio front end circuitry 86 may be coupled to or a part of antenna 70. In some embodiments, WD 34-1 may not include separate radio front end circuitry 86; rather, processing circuitry 74 may comprise radio front end circuitry 86 and may be connected to antenna 70. Similarly, in some embodiments, some or all of RF transceiver circuitry 92 may be considered a part of interface 72. Radio front end circuitry 86 may receive digital data that is to be sent out to other network nodes or WDs via a wireless connection. Radio front end circuitry 86 may convert the digital data into a radio signal having the appropriate channel and bandwidth parameters using a combination of filters 88 and/or amplifiers 90. The radio signal may then be transmitted via antenna 70. Similarly, when receiving data, antenna 70 may collect radio signals which are then converted into digital data by radio front end circuitry 86. The digital data may be passed to processing circuitry 74. In other embodiments, the interface may comprise different components and/or different combinations of components.

Processing circuitry 74 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 34-1 components, such as device readable medium 76, WD 34-1 functionality. Such functionality may include providing any of the various wireless features or benefits discussed herein. For example, processing circuitry 74 may execute instructions stored in device readable medium 76 or in memory within processing circuitry 74 to provide the functionality disclosed herein.

As illustrated, processing circuitry 74 includes one or more of RF transceiver circuitry 92, baseband processing circuitry 94, and application processing circuitry 96. In other embodiments, the processing circuitry may comprise different components and/or different combinations of components. In certain embodiments processing circuitry 74 of WD 34-1 may comprise a SOC. In some embodiments, RF transceiver circuitry 92, baseband processing circuitry 94, and application processing circuitry 96 may be on separate chips or sets of chips. In alternative embodiments, part or all of baseband processing circuitry 94 and application processing circuitry 96 may be combined into one chip or set of chips, and RF transceiver circuitry 92 may be on a separate chip or set of chips. In still alternative embodiments, part or all of RF transceiver circuitry 92 and baseband processing circuitry 94 may be on the same chip or set of chips, and application processing circuitry 96 may be on a separate chip or set of chips. In yet other alternative embodiments, part or all of RF transceiver circuitry 92, baseband processing circuitry 94, and application processing circuitry 96 may be combined in the same chip or set of chips. In some embodiments, RF transceiver circuitry 92 may be a part of interface 72. RF transceiver circuitry 92 may condition RF signals for processing circuitry 74.

In certain embodiments, some or all of the functionality described herein as being performed by a WD may be provided by processing circuitry 74 executing instructions stored on device readable medium 76, which in certain embodiments may be a computer-readable storage medium. In alternative embodiments, some or all of the functionality may be provided by processing circuitry 74 without executing instructions stored on a separate or discrete device readable storage medium, such as in a hard-wired manner. In any of those particular embodiments, whether executing instructions stored on a device readable storage medium or not, processing circuitry 74 can be configured to perform the described functionality. The benefits provided by such functionality are not limited to processing circuitry 74 alone or to other components of WD 34-1 but are enjoyed by WD 34-1 as a whole, and/or by end users and the wireless network generally.

Processing circuitry 74 may be configured to perform any determining, calculating, or similar operations (e.g., certain obtaining operations) described herein as being performed by a WD. These operations, as performed by processing circuitry 74, may include processing information obtained by processing circuitry 74 by, for example, converting the obtained information into other information, comparing the obtained information or converted information to information stored by WD 34-1, and/or performing one or more operations based on the obtained information or converted information, and as a result of said processing making a determination.

Device readable medium 76 may be operable to store a computer program, software, an application including one or more of logic, rules, code, tables, etc. and/or other instructions capable of being executed by processing circuitry 74. Device readable medium 76 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 74. In some embodiments, processing circuitry 74 and device readable medium 76 may be considered to be integrated.

User interface equipment 78 may provide components that allow for a human user to interact with WD 34-1. Such interaction may be of many forms, such as visual, audial, tactile, etc. User interface equipment 78 may be operable to produce output to the user and to allow the user to provide input to WD 34-1. The type of interaction may vary depending on the type of user interface equipment 78 installed in WD 34-1. For example, if WD 34-1 is a smart phone, the interaction may be via a touch screen; if WD 34-1 is a smart meter, the interaction may be through a screen that provides usage (e.g., the number of gallons used) or a speaker that provides an audible alert (e.g., if smoke is detected). User interface equipment 78 may include input interfaces, devices and circuits, and output interfaces, devices and circuits. User interface equipment 78 is configured to allow input of information into WD 34-1 and is connected to processing circuitry 74 to allow processing circuitry 74 to process the input information. User interface equipment 78 may include, for example, a microphone, a proximity or other sensor, keys/buttons, a touch display, one or more cameras, a USB port, or other input circuitry. User interface equipment 78 is also configured to allow output of information from WD 34-1, and to allow processing circuitry 74 to output information from WD 34-1. User interface equipment 78 may include, for example, a speaker, a display, vibrating circuitry, a USB port, a headphone interface, or other output circuitry. Using one or more input and output interfaces, devices, and circuits, of user interface equipment 78, WD 34-1 may communicate with end users and/or the wireless network and allow them to benefit from the functionality described herein.

Auxiliary equipment 80 is operable to provide more specific functionality which may not be generally performed by WDs. This may comprise specialized sensors for doing measurements for various purposes, interfaces for additional types of communication such as wired communications etc. The inclusion and type of components of auxiliary equipment 80 may vary depending on the embodiment and/or scenario.

Power source 82 may, in some embodiments, be in the form of a battery or battery pack. Other types of power sources, such as an external power source (e.g., an electricity outlet), photovoltaic devices or power cells, may also be used. WD 34-1 may further comprise power circuitry 84 for delivering power from power source 82 to the various parts of WD 34-1 which need power from power source 82 to carry out any functionality described or indicated herein. Power circuitry 84 may in certain embodiments comprise power management circuitry. Power circuitry 84 may additionally or alternatively be operable to receive power from an external power source; in which case WD 34-1 may be connectable to the external power source (such as an electricity outlet) via input circuitry or an interface such as an electrical power cable. Power circuitry 84 may also in certain embodiments be operable to deliver power from an external power source to power source 82. This may be, for example, for the charging of power source 82. Power circuitry 84 may perform any formatting, converting, or other modification to the power from power source 82 to make the power suitable for the respective components of WD 34-1 to which power is supplied.

Figure 10:
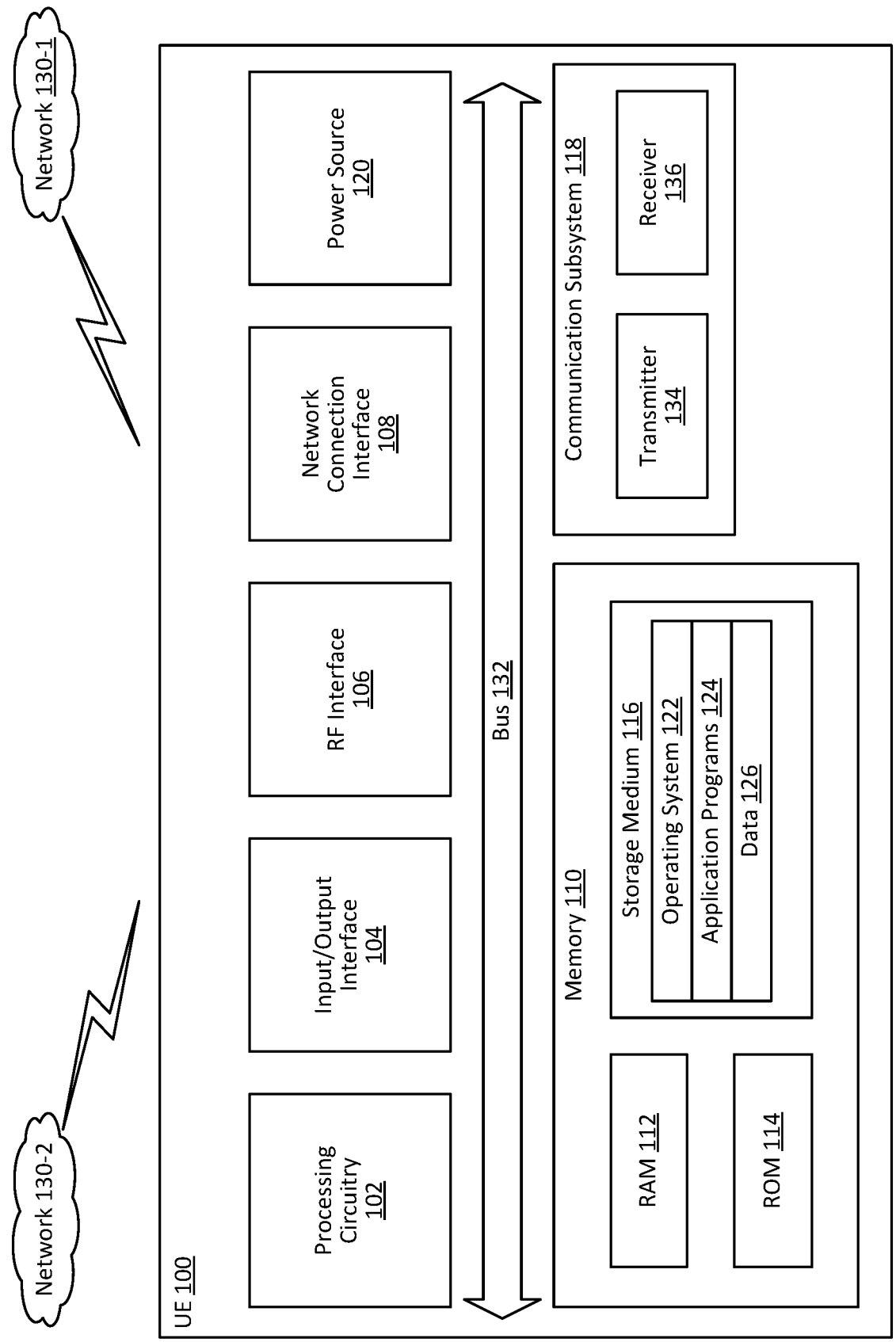
FIG. 10 is a block diagram of another embodiment of a UE.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The illustrated UE 100 may be understood as an elaboration of the WD 10 illustrated in FIG. 5, or as an alternative embodiment. Further, the UE 100 may be any UE identified by the 3rd Generation Partnership Project (3GPP), including a NB-IoT UE, a machine type communication (MTC) UE, and/or an enhanced MTC (eMTC) UE. UE 100, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeably. Accordingly, although FIG. 10 is a UE, the components discussed herein are equally applicable to a WD, and vice-versa.

In FIG. 10, UE 100 includes processing circuitry 102 that is operatively coupled to input/output interface 104, radio frequency (RF) interface 106, network connection interface 108, memory 110 including random access memory (RAM) 112, read-only memory (ROM) 114, and storage medium 116 or the like, communication subsystem 118, power source 120, and/or any other component, or any combination thereof. Storage medium 116 includes operating system 122, application program 124, and data 126. In other embodiments, storage medium 116 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 102 may be configured to process computer instructions and data. Processing circuitry 102 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 102 may include two central processing units (CPUs). Data may be information in a form suitable for use by a computer.

In the depicted embodiment, input/output interface 104 may be configured to provide a communication interface to an input device, output device, or input and output device. UE 100 may be configured to use an output device via input/output interface 104. An output device may use the same type of interface port as an input device. For example, a USB port may be used to provide input to and output from UE 100. The output device may be a speaker, a sound card, a video card, a display, a monitor, a printer, an actuator, an emitter, a smartcard, another output device, or any combination thereof. UE 100 may be configured to use an input device via input/output interface 104 to allow a user to capture information into UE 100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 106 may be configured to provide a communication interface to RF components such as a transmitter, a receiver, and an antenna. Network connection interface 108 may be configured to provide a communication interface to network 130-1. Network 130-1 may encompass wired and/or wireless networks such as a local-area network (LAN), a wide-area network (WAN), a computer network, a wireless network, a telecommunications network, another like network or any combination thereof. For example, network 130-1 may comprise a Wi-Fi network. Network connection interface 108 may be configured to include a receiver and a transmitter interface used to communicate with one or more other devices over a communication network according to one or more communication protocols, such as Ethernet, TCP/IP, SONET, ATM, or the like. Network connection interface 108 may implement receiver and transmitter functionality appropriate to the communication network links (e.g., optical, electrical, and the like). The transmitter and receiver functions may share circuit components, software or firmware, or alternatively may be implemented separately.

RAM 112 may be configured to interface via bus 132 to processing circuitry 102 to provide storage or caching of data or computer instructions during the execution of software programs such as the operating system, application programs, and device drivers. ROM 114 may be configured to provide computer instructions or data to processing circuitry 102. For example, ROM 114 may be configured to store invariant low-level system code or data for basic system functions such as basic input and output (I/O), startup, or reception of keystrokes from a keyboard that are stored in a non-volatile memory. Storage medium 116 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 116 may be configured to include operating system 122, application program 124 such as a web browser application, a widget or gadget engine or another application, and data file 126. Storage medium 116 may store, for use by UE 100, any of a variety of various operating systems or combinations of operating systems.

Storage medium 116 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 116 may allow UE 100 to access computer-executable instructions, application programs or the like, stored on transitory or non-transitory memory media, to off-load data, or to upload data. An article of manufacture, such as one utilizing a communication system may be tangibly embodied in storage medium 116, which may comprise a device readable medium.

In FIG. 10, processing circuitry 102 may be configured to communicate with network 130-2 using communication subsystem 118. Network 130-1 and network 130-2 may be the same network or networks or different network or networks. Communication subsystem 118 may be configured to include one or more transceivers used to communicate with network 130-2. For example, communication subsystem 118 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter 134 and/or receiver 136 to implement transmitter or receiver functionality, respectively, appropriate to the RAN links (e.g., frequency allocations and the like). Further, transmitter 134 and receiver 136 of each transceiver may share circuit components, software or firmware, or alternatively may be implemented separately.

In the illustrated embodiment, the communication functions of communication subsystem 118 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 118 may include cellular communication, Wi-Fi communication, Bluetooth communication, and GPS communication. Network 130-2 may encompass wired and/or wireless networks such as a local-area network (LAN), a wide-area network (WAN), a computer network, a wireless network, a telecommunications network, another like network or any combination thereof. For example, network 130-2 may be a cellular network, a Wi-Fi network, and/or a near-field network. Power source 120 may be configured to provide alternating current (AC) or direct current (DC) power to components of UE 100.

The features, benefits and/or functions described herein may be implemented in one of the components of UE 100 or partitioned across multiple components of UE 100. Further, the features, benefits, and/or functions described herein may be implemented in any combination of hardware, software or firmware. In one example, communication subsystem 118 may be configured to include any of the components described herein. Further, processing circuitry 102 may be configured to communicate with any of such components over bus 132. In another example, any of such components may be represented by program instructions stored in memory that when executed by processing circuitry 102 performs the corresponding functions described herein. In another example, the functionality of any of such components may be partitioned between processing circuitry 102 and communication subsystem 118. In another example, the non-computationally intensive functions of any of such components may be implemented in software or firmware and the computationally intensive functions may be implemented in hardware.

Figure 11:
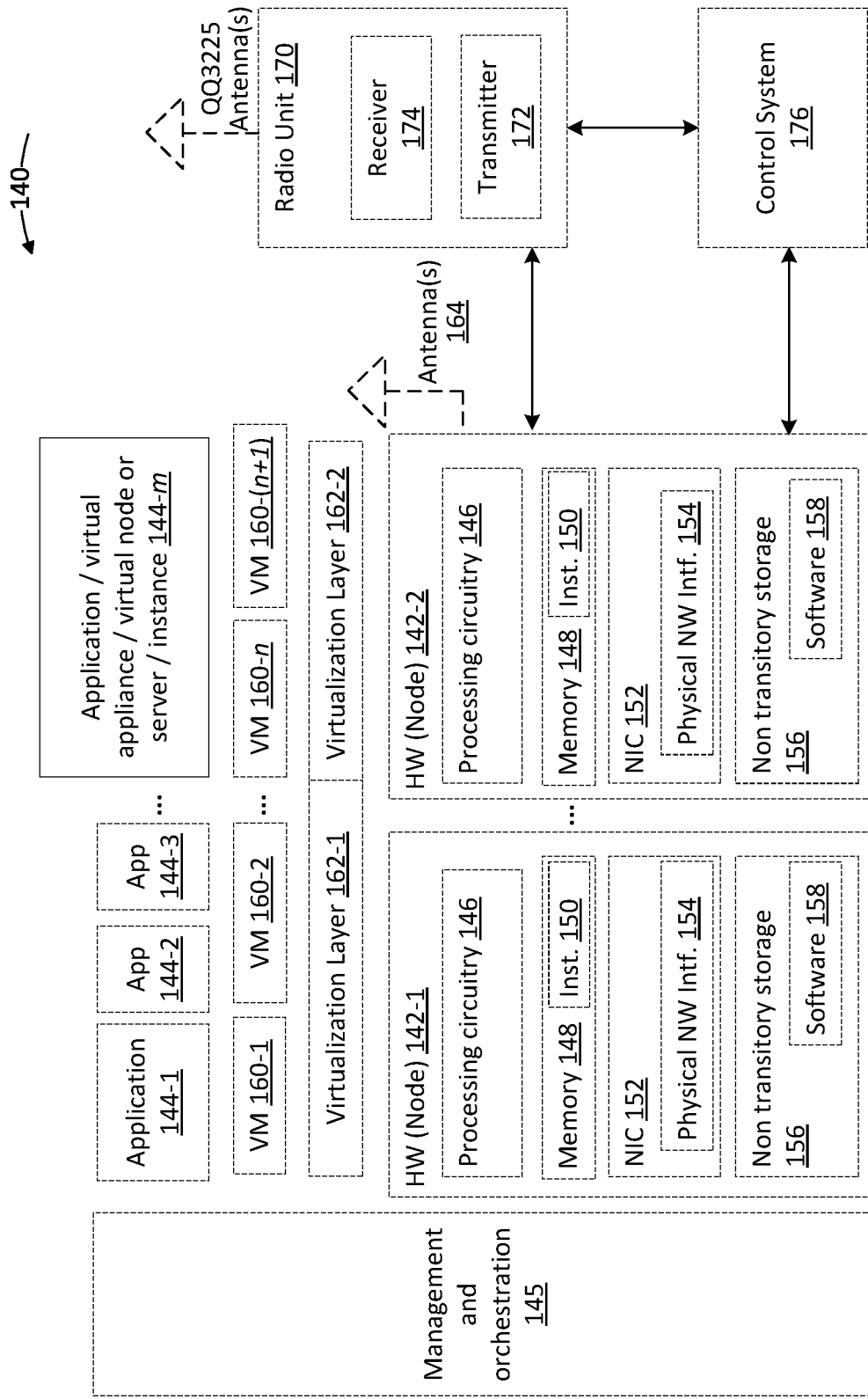
FIG. 11 is a block diagram of one embodiment of a virtualization environment.

FIG. 11 is a schematic block diagram illustrating a virtualization environment 140 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 140 hosted by one or more of hardware nodes 142, e.g., 142-1 and 142-2. Further, in embodiments in which the virtual node is not a radio access node or does not require radio connectivity (e.g., a core network node), the network node may be entirely virtualized.

The functions may be implemented by one or more applications 144, e.g., 144-1, 144-2, 144-3, 144-*m*. Application(s) 144 may be referred to as apps, software instances, virtual appliances, network functions, virtual nodes, virtual network functions, etc., and are operative to implement some of the features, functions, and/or benefits of some of the embodiments disclosed herein. Applications 144 are run in virtualization environment 140 which provides hardware 142 comprising processing circuitry 146 and memory 148. Memory 148 contains instructions 150 executable by processing circuitry 146 whereby application 144 is operative to provide one or more of the features, benefits, and/or functions disclosed herein.

Virtualization environment 140, comprises general-purpose or special-purpose network hardware devices 142 comprising a set of one or more processors or processing circuitry 146, which may be commercial off-the-shelf (COTS) processors, dedicated Application Specific Integrated Circuits (ASICs), or any other type of processing circuitry including digital or analog hardware components or special purpose processors. Each hardware device may comprise memory 148 which may be non-persistent memory for temporarily storing instructions (Inst.) 150 or software executed by processing circuitry 146. Each hardware device may comprise one or more network interface controllers (NICs) 152, also known as network interface cards, which include physical network interface 154. Each hardware device may also include non-transitory, persistent, machine-readable storage media 156 having stored therein instructions executable by processing circuitry 146, e.g., software 158.

Software 158 may include any type of software including software for instantiating one or more virtualization layers 162 (also referred to as hypervisors), software to execute virtual machines 160 as well as software allowing it to execute functions, features and/or benefits described in relation with some embodiments described herein. Software 158 in one node 142 may or may not be the same as the software 158 in another node 142. More generally, although the diagram depicts the nodes 142 as comprising various elements or entities identified by like reference numbers, such elements or entities may differ between nodes 142.

Virtual machines 160 comprise virtual processing, virtual memory, virtual networking or interface and virtual storage, and may be run by a corresponding virtualization layer 162 or hypervisor. Different embodiments of the instance of virtual appliance 144 may be implemented on one or more of virtual machines 160, and the implementations may be made in different ways. Example virtual machines or VMs include VMs 160-1, 160-2, 160-*n*, and 160-(*n*+1).

During operation, processing circuitry 146 executes software 158 to instantiate one or more hypervisors or virtualization layers 162, e.g., 162-1 and 162-2. The virtualization layers(s) 162 may be referred to as a virtual machine monitors (VMMs). Virtualization layer(s) 162 may present a virtual operating platform that appears like networking hardware to virtual machine(s) 160.

As shown in FIG. 11, hardware 142 may be a standalone network node with generic or specific components. Hardware 142 may comprise antenna 164 and may implement some functions via virtualization. Alternatively, hardware 142 may be part of a larger cluster of hardware (e.g. such as in a data center or customer premise equipment (CPE)) where many hardware nodes work together and are managed via management and orchestration (MANO) 145, which, among others, oversees lifecycle management of applications 144.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 160 may be a software implementation of a physical machine that runs programs as if they were executing on a physical, non-virtualized machine. Each of virtual machines 160, and that part of hardware 142 that executes that virtual machine, be it hardware dedicated to that virtual machine and/or hardware shared by that virtual machine with others of the virtual machines 160, forms a separate virtual network elements (VNE).

Still in the context of NFV, Virtual Network Function (VNF) is responsible for handling specific network functions that run in one or more virtual machines 160 on top of hardware networking infrastructure 142 and corresponds to application 144 in FIG. 11.

In some embodiments, one or more radio units 170 that each include one or more transmitters 172 and one or more receivers 174 may be coupled to one or more antennas 164. Radio units 170 may communicate directly with hardware nodes 142 via one or more appropriate network interfaces and may be used in combination with the virtual components to provide a virtual node with radio capabilities, such as a radio access node or a base station.

In some embodiments, some signaling can be effected with the use of control system 176 which may alternatively be used for communication between the hardware nodes 142 and radio units 170.

Figure 12:
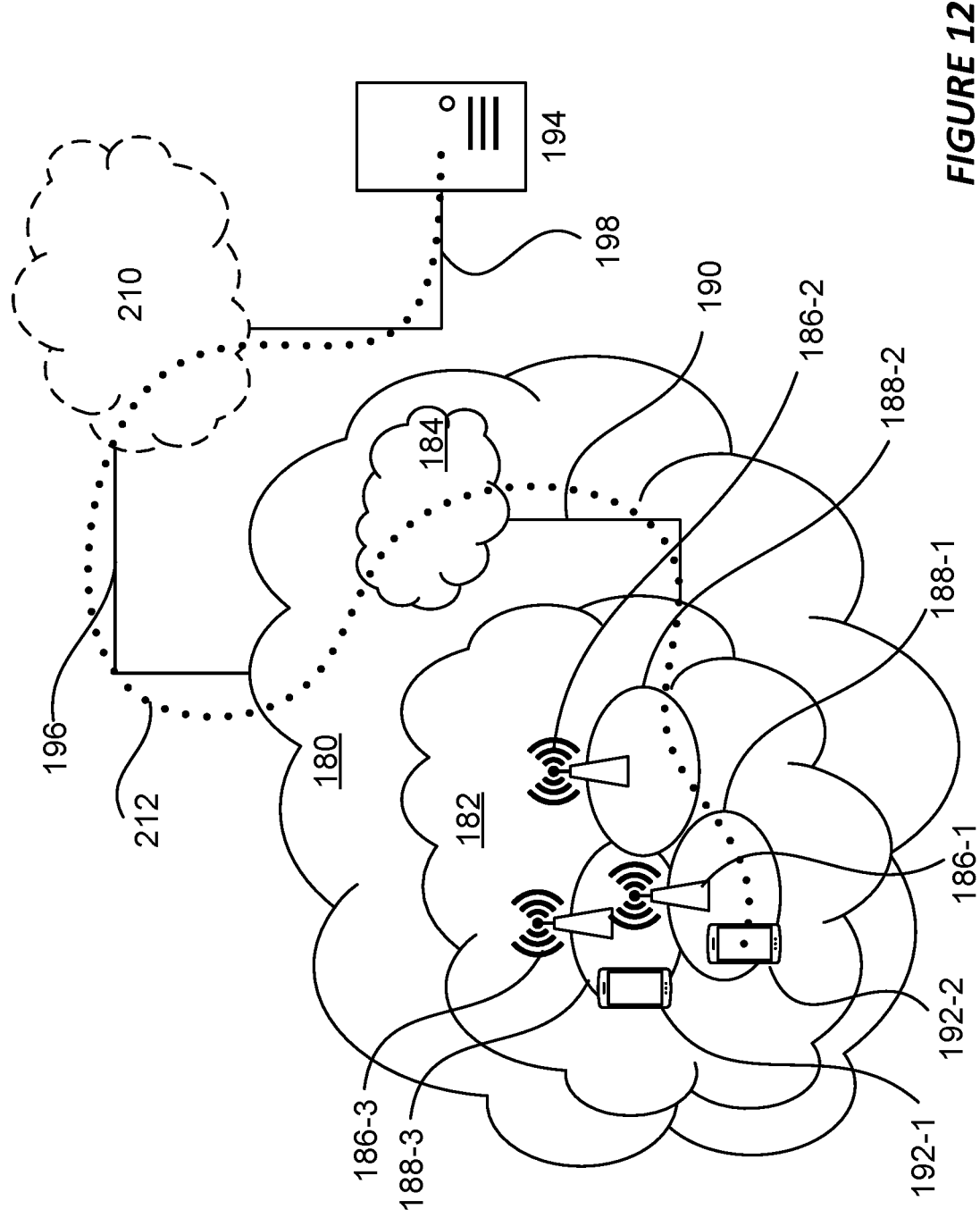
FIG. 12 a block diagram of another embodiment of a telecommunication network.

FIG. 12 illustrates a telecommunication network connected via an intermediate network to a host computer in accordance with some embodiments. In particular, with reference to FIG. 12, in accordance with an embodiment, a communication system includes telecommunication network 180, such as a 3GPP-type cellular network, which comprises access network 182, such as a radio access network, and core network 184. Access network 182 comprises a plurality of base stations 186, e.g., 186-1, 186-2, and 186-3. The base stations 186 are, for example, NBs, eNBs, gNBs or other types of wireless access points. The base stations 186 define corresponding coverage areas 188, e.g., 188-1, 188-2, and 188-3. Each base station 186-1, 186-2, and 186-3 is connectable to core network 184 over a wired or wireless connection 190. A first UE 192-1 located in coverage area 188-3 is configured to wirelessly connect to, or be paged by, the corresponding base station 186-3. A second UE 192-2 in coverage area 188-1 is wirelessly connectable to the corresponding base station 186-1. While a plurality of UEs 192 are illustrated in this example, e.g., UEs 192-1, and 192-2, the disclosed embodiments are equally applicable to a situation where a sole UE is in a coverage area or where a sole UE connects to a corresponding base station.

Telecommunication network 180 is itself connected to host computer 194, which may be embodied in the hardware and/or software of a standalone server, a cloud-implemented server, a distributed server or as processing resources in a server farm. Host computer 194 may be under the ownership or control of a service provider or may be operated by the service provider or on behalf of the service provider. Connections 196 and 198 between telecommunication network 180 and host computer 194 may extend directly from core network 184 to host computer 194 or may go via an optional intermediate network 210. Intermediate network 210 may be one of, or a combination of more than one of, a public, private or hosted network; intermediate network 210, if any, may be a backbone network or the Internet; in particular, intermediate network 210 may comprise two or more subnetworks (not shown).

The communication system of FIG. 12 as a whole enables connectivity between the connected UEs 192-1, 192-2 and host computer 194. The connectivity may be described as an over-the-top (OTT) connection 212. Host computer 194 and the connected UEs 192-1, 192-2 are configured to communicate data and/or signaling via OTT connection 212, using access network 182, core network 184, any intermediate network 210 and possible further infrastructure (not shown) as intermediaries. OTT connection 212 may be transparent in the sense that the participating communication devices through which OTT connection 212 passes are unaware of routing of uplink and downlink communications. For example, a base station 186 may not or need not be informed about the past routing of an incoming downlink communication with data originating from host computer 194 to be forwarded (e.g., handed over) to a connected UE 192. Similarly, a base station 186 need not be aware of the future routing of an outgoing uplink communication originating from a UE 192 towards the host computer 194.

Figure 13:
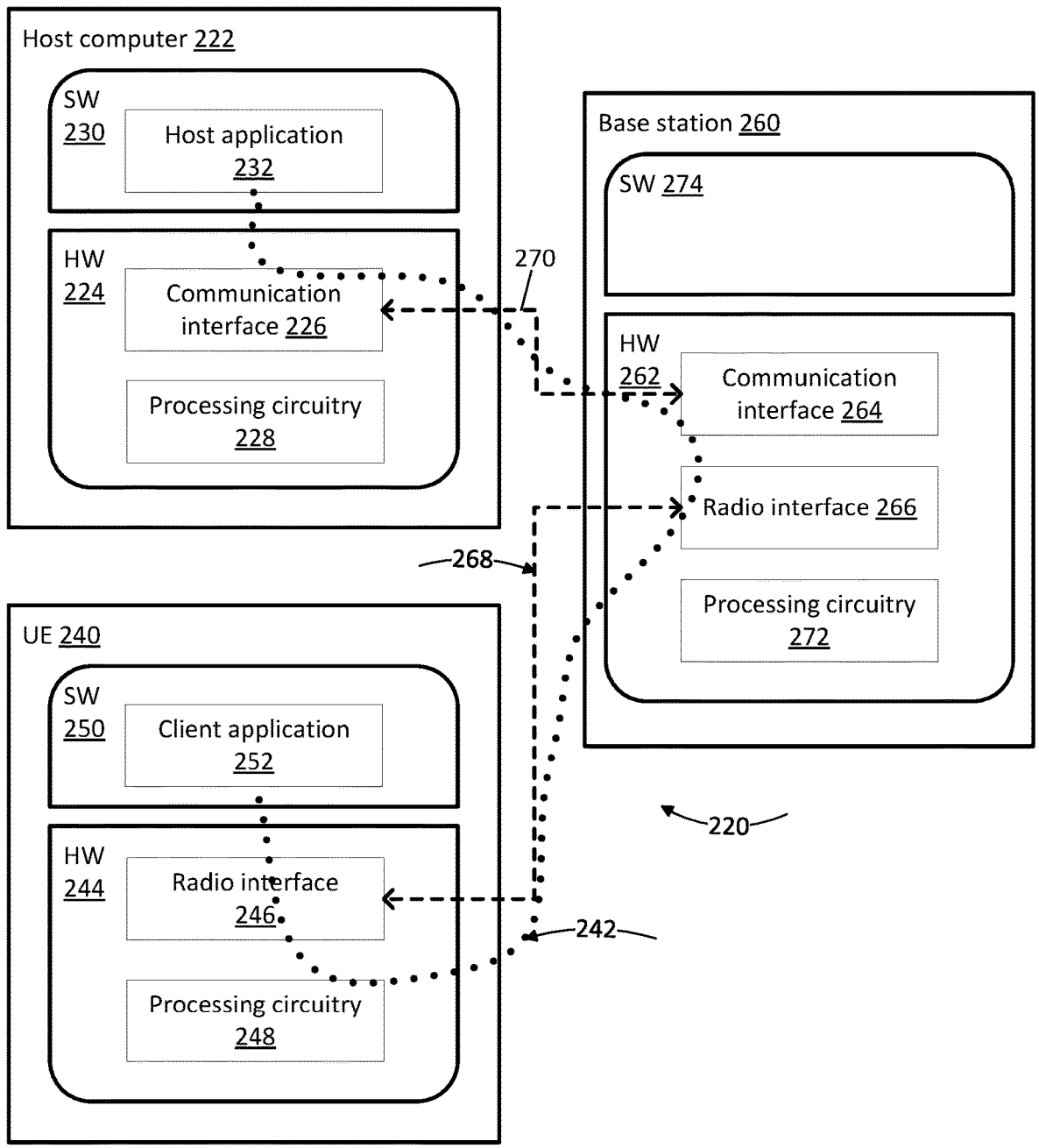
FIG. 13 is a block diagram of further example embodiments of a host computer, a network node of a telecommunication network, and a UE configured for communicating with the host computer via the telecommunication network.

Example implementations, in accordance with an embodiment, of the UE, base station and host computer discussed in the preceding paragraphs will now be described with reference to FIG. 13. FIG. 13 illustrates a host computer communicating via a base station with a user equipment over a partially wireless connection in accordance with some embodiments. In communication system 220, host computer 222 comprises hardware 224 including communication interface 226 configured to set up and maintain a wired or wireless connection with an interface of a different communication device of communication system 220. Host computer 222 further comprises processing circuitry 228, which may have storage and/or processing capabilities. In particular, processing circuitry 228 may comprise one or more programmable processors, application-specific integrated circuits, field programmable gate arrays or combinations of these (not shown) adapted to execute instructions. Host computer 222 further comprises software 230, which is stored in or accessible by host computer 222 and executable by processing circuitry 228. Software 230 includes host application 232. Host application 232 may be operable to provide a service to a remote user, such as UE 240 connecting via OTT connection 242 terminating at UE 240 and host computer 222. In providing the service to the remote user, host application 232 may provide user data which is transmitted using OTT connection 242.

Hardware 244 of the UE 240 may include radio interface 246 configured to set up and maintain wireless connection 268 with a base station serving a coverage area in which UE 240 is currently located. Hardware 244 of UE 240 further includes processing circuitry 248, which may comprise one or more programmable processors, application-specific integrated circuits, field programmable gate arrays or combinations of these (not shown) adapted to execute instructions. UE 240 further comprises software 250, which is stored in or accessible by UE 240 and executable by processing circuitry 248. Software 250 includes client application 252. Client application 252 may be operable to provide a service to a human or non-human user via UE 240, with the support of host computer 222. In host computer 222, an executing host application 232 may communicate with the executing client application 252 via OTT connection 242 terminating at UE 240 and host computer 222. In providing the service to the user, client application 252 may request data from host application 232 and provide user data in response to the request data. OTT connection 242 may transfer both the request data and the user data. Client application 252 may interact with the user to generate the user data that it provides.

Communication system 220 further includes base station 260 provided in a telecommunication system and comprising hardware 262 enabling it to communicate with host computer 222 and with UE 240. Hardware 262 may include communication interface 264 for setting up and maintaining a wired or wireless connection with an interface of a different communication device of communication system 220, as well as radio interface 266 for setting up and maintaining at least wireless connection 268 with UE 240 located in a coverage area (not shown in FIG. 13) served by base station 260. Communication interface 264 may be configured to facilitate connection 270 to host computer 222. Connection 270 may be direct, or it may pass through a core network (not shown in FIG. 13) of the telecommunication system and/or through one or more intermediate networks outside the telecommunication system. In the embodiment shown, hardware 262 of base station 260 further includes processing circuitry 272, which may comprise one or more programmable processors, application-specific integrated circuits, field programmable gate arrays or combinations of these (not shown) adapted to execute instructions. Base station 260 further has software 274 stored internally or accessible via an external connection.

It is noted that the host computer 222 may be similar or identical to the host computer 194 in FIG. 12, the base station 260 may be similar or identical to a base station 186 in FIG. 12, and the UE 240 may be similar or identical to a UE 192 in FIG. 12. This is to say, the inner workings of these entities may be as shown in FIG. 13 and independently, the surrounding network topology may be that of FIG. 12.

In FIG. 13, OTT connection 242 has been drawn abstractly to illustrate the communication between host computer 222 and UE 240 via base station 260, without explicit reference to any intermediary devices and the precise routing of messages via these devices. Network infrastructure may determine the routing, which may be configured to hide from UE 240 or from the service provider operating host computer 222, or both. While OTT connection 242 is active, the network infrastructure may further take decisions by which it dynamically changes the routing (e.g., on the basis of load balancing consideration or reconfiguration of the network).

Wireless connection 268 between UE 240 and base station 260 is in accordance with the teachings of the embodiments described throughout this disclosure. One or more of the various embodiments improve the performance of OTT services provided to UE 240 using OTT connection 242, in which wireless connection 268 forms the last segment. More precisely, the teachings of these embodiments allow multiple contiguous or non-contiguous LTE carriers to be shared across a single NR bandwidth using the framework for LTE/NR resource sharing defined in 3GPP Release 15. This spectrum sharing solution allows NR transmissions to employ wider bandwidths than would be achievable if LTE/NR sharing was supported only across a single LTE carrier. This thereby provides benefits such as increased capacity and better service.

A measurement procedure may be provided for the purpose of monitoring data rate, latency and other factors on which the one or more embodiments improve. There may further be an optional network functionality for reconfiguring OTT connection 242 between host computer 222 and UE 240, in response to variations in the measurement results. The measurement procedure and/or the network functionality for reconfiguring OTT connection 242 may be implemented in software 230 and hardware 224 of host computer 222 or in software 250 and hardware 244 of UE 240, or both. In embodiments, sensors (not shown) may be deployed in or in association with communication devices through which OTT connection 242 passes; the sensors may participate in the measurement procedure by supplying values of the monitored quantities exemplified above, or supplying values of other physical quantities from which software 230, 250 may compute or estimate the monitored quantities. The reconfiguring of OTT connection 242 may include message format, retransmission settings, preferred routing etc.; the reconfiguring need not affect base station 260, and it may be unknown or imperceptible to base station 260. Such procedures and functionalities may be known and practiced in the art. In certain embodiments, measurements may involve proprietary UE signaling facilitating host computer 222's measurements of throughput, propagation times, latency and the like. The measurements may be implemented in that software 230 and 250 causes messages to be transmitted, in particular empty or "dummy" messages, using OTT connection 242 while it monitors propagation times, errors etc.

Figure 14:
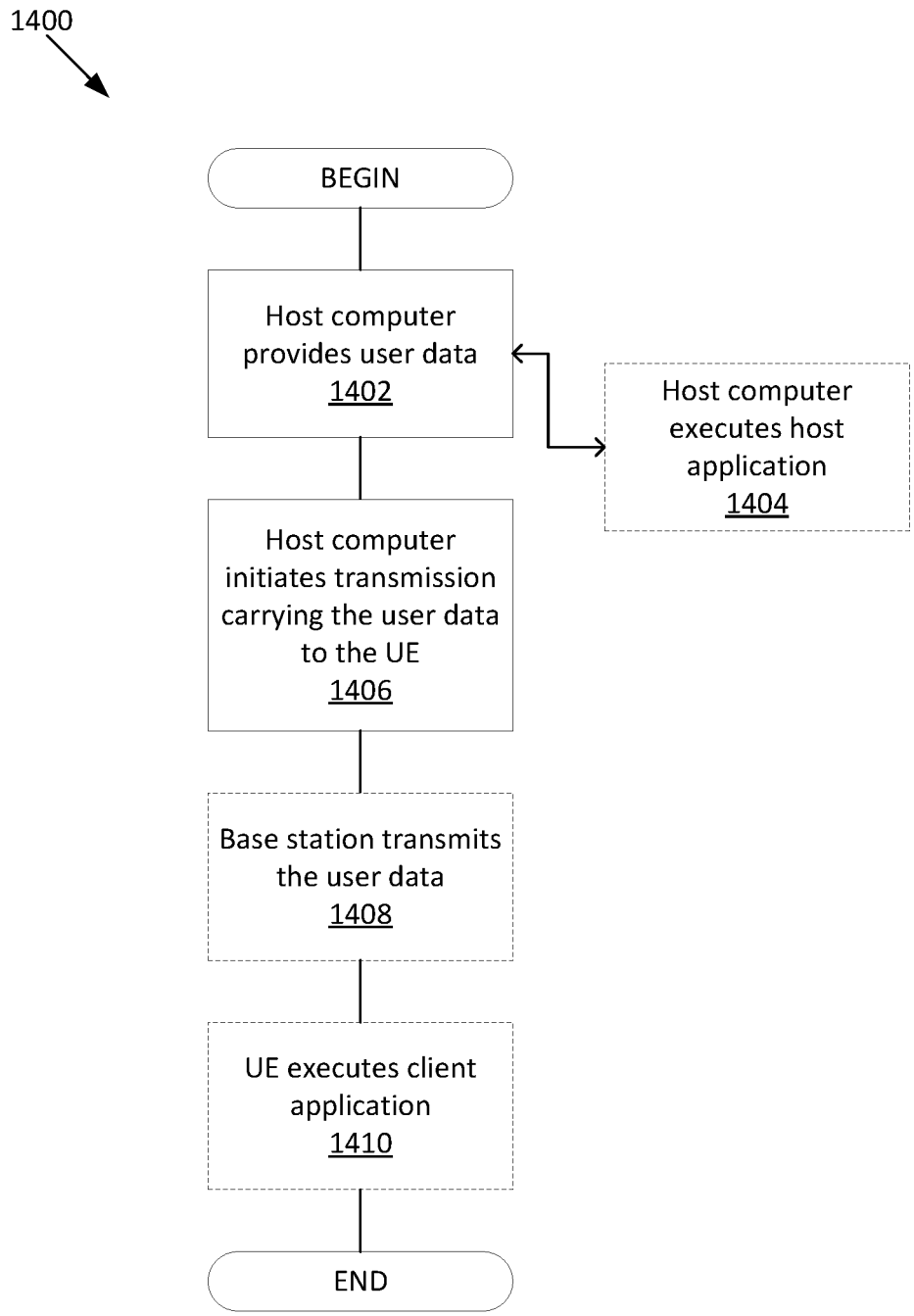
FIG. 14 is a logic flow diagram of one embodiment of a method of operation by a host computer, a network node of a telecommunication network, and a UE.

FIG. 14 is a flowchart illustrating a method 1400 implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1402, the host computer provides user data. In sub step 1404 (which may be optional) of step 1402, the host computer provides the user data by executing a host application. In step 1406, the host computer initiates a transmission carrying the user data to the UE. In step 1408 (which may be optional), the base station transmits to the UE the user data which was carried in the transmission that the host computer initiated, in accordance with the teachings of the embodiments described throughout this disclosure. In step 1410 (which may also be optional), the UE executes a client application associated with the host application executed by the host computer.

Figure 15:
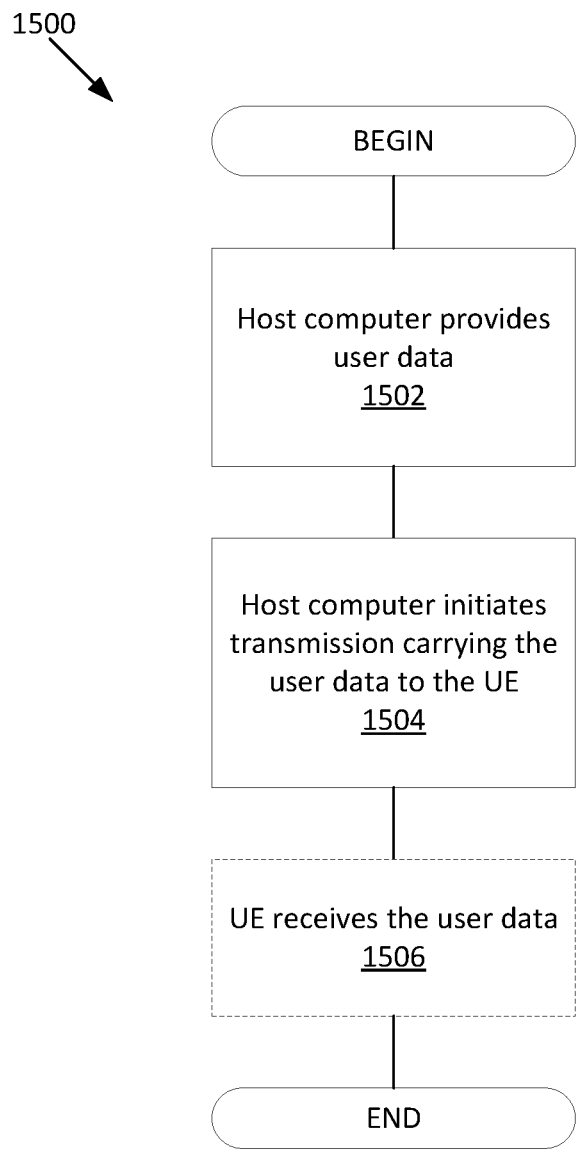
FIG. 15 is a logic flow diagram of one embodiment of a method of operation by a host computer and a UE.

FIG. 15 is a flowchart illustrating a method 1500 implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1502 of the method, the host computer provides user data. In an optional sub step (not shown) the host computer provides the user data by executing a host application. In step 1504, the host computer initiates a transmission carrying the user data to the UE. The transmission may pass via the base station, in accordance with the teachings of the embodiments described throughout this disclosure. In step 1506 (which may be optional), the UE receives the user data carried in the transmission.

Figure 16:
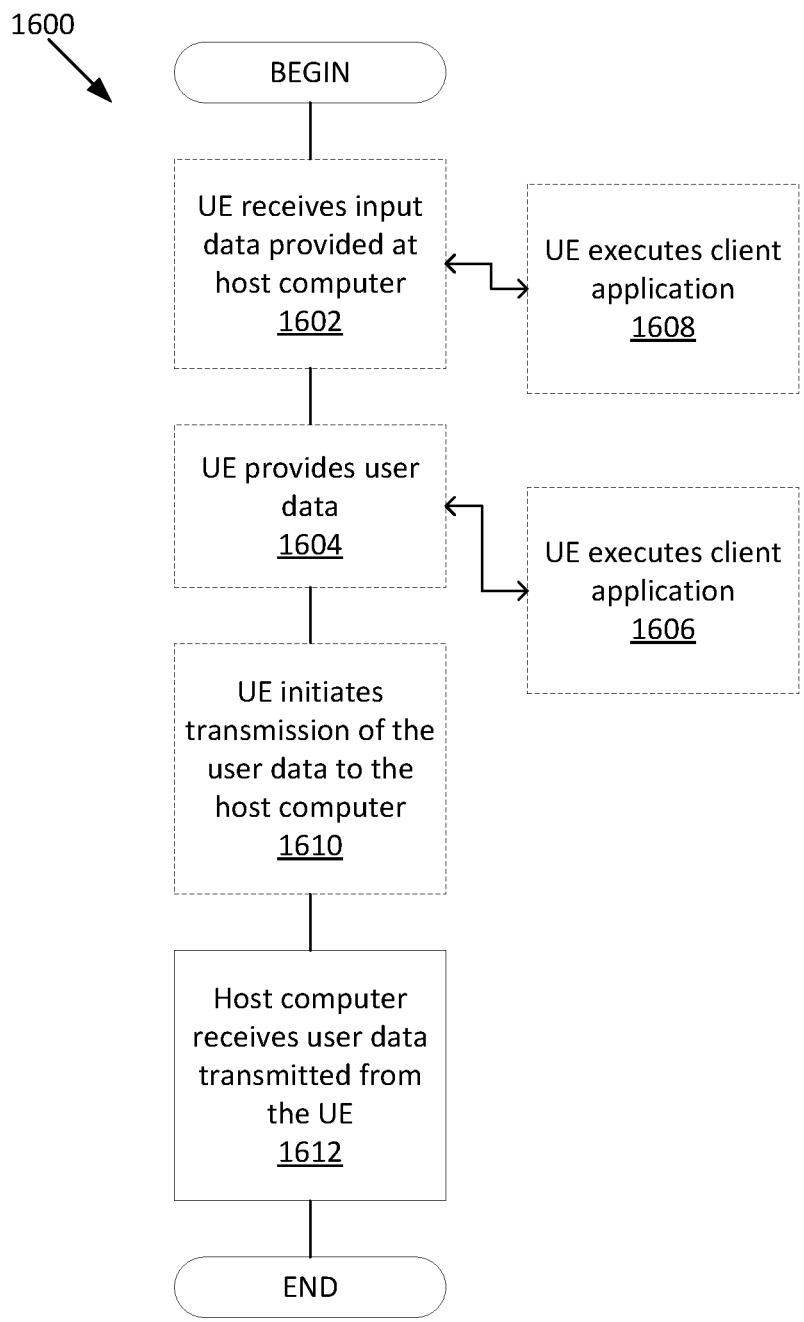
FIG. 16 is a logic flow diagram of another embodiment of a method of operation by a host computer and a UE.

FIG. 16 is a flowchart illustrating a method 1600 implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1602 (which may be optional), the UE receives input data provided by the host computer. Additionally, or alternatively, in step 1604, the UE provides user data. In sub step 1606 (which may be optional), the UE provides the user data by executing a client application. In sub step 1608 (which may be optional) of step 1602, the UE executes a client application which provides the user data in reaction to the received input data provided by the host computer. In providing the user data, the executed client application may further consider user input received from the user. Regardless of the specific manner in which the user data was provided, the UE initiates, in sub step 1610 (which may be optional), transmission of the user data to the host computer. In step 1612 of the method, the host computer receives the user data transmitted from the UE, in accordance with the teachings of the embodiments described throughout this disclosure.

Figure 17:
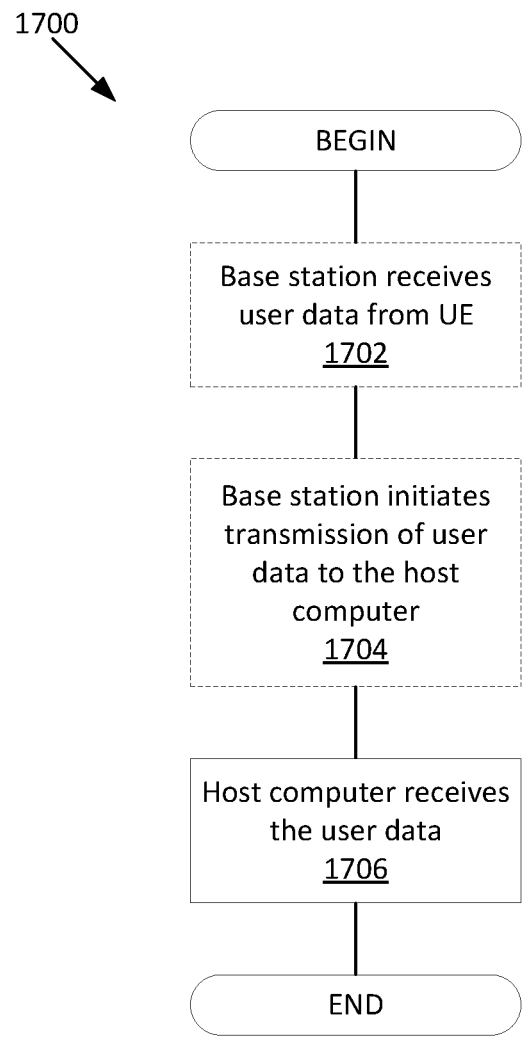
FIG. 17 is a logic flow diagram of one embodiment of a method of operation by a host computer and a network node of a telecommunication network.

FIG. 17 is a flowchart illustrating a method 1700 implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1702 (which may be optional), in accordance with the teachings of the embodiments described throughout this disclosure, the base station receives user data from the UE. In step 1704 (which may be optional), the base station initiates transmission of the received user data to the host computer. In step 1706 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a network node of a wireless communication network, the method comprising:
for a first radio frequency (RF) carrier spanning an RF spectrum that encompasses two or more other RF carriers, determining a resource-usage pattern for control-related signaling conveyed on each of the two or more other RF carriers; and
transmitting, to a wireless communication device, rate-matching information for each of two or more bandwidth parts (BWPs) of the first RF carrier, each BWP occupying RF spectrum used by a respective one of the two or more other RF carriers, and the rate-matching information is transmitted for each BWP based on the resource-usage pattern determined for the respective other RF carrier, wherein the resource-usage pattern is exchanged, the exchanging of the resource-usage pattern is determined based on a mechanism available for a spectrum-sharing arrangement.

2. The method of claim 1, wherein the network node is a radio network node configured as a Fifth Generation (5G) Radio Access Network (RAN) node, and wherein the first RF carrier is a New Radio (NR) carrier of the 5G RAN operated in a spectrum-sharing arrangement with two or more Long Term Evolution (LTE) carriers, as said two or more other RF carriers.

3. The method of claim 2, wherein the radio network node determines the resource-usage pattern for control-related signaling conveyed on each of the LTE carriers based on communicating with another radio network entity having knowledge of the LTE carriers.

4. The method of claim 1, wherein the radio network node configures the BWPs such that each BWP aligns with a respective one of the two or more other RF carriers, configures wireless communication devices to use respective ones of the BWPs, and transmits the rate-matching information for each BWP to the wireless communication devices configured to use the BWP.

5. A network node configured for operation in a wireless communication network, the network node comprising:
   communication circuitry; and
   processing circuitry configured to:
      for a first radio frequency (RF) carrier spanning an RF spectrum that encompasses two or more other RF carriers, determine a resource-usage pattern for control-related signaling conveyed on each of the two or more other RF carriers; and
      transmit, via the communication circuitry, to a wireless communication device, rate-matching information for each of two or more bandwidth parts (BWPs) of the first RF carrier, each BWP occupying RF spectrum used by a respective one of the two or more other RF carriers, and the rate-matching information is transmitted for each BWP based on the resource-usage pattern determined for the respective other RF carrier, wherein the resource-usage pattern is exchanged, the exchanging of the resource-usage pattern is determined based on a mechanism available for a spectrum-sharing arrangement.

6. A method performed by a network node of a wireless communication network, the method comprising:
   for a first radio frequency (RF) carrier, configuring two or more bandwidth parts (BWPs), each BWP aligned with a respective one of two or more other RF carriers positioned within the RF spectrum spanned by the first RF carrier;
   determining a frequency-sharing configuration for each BWP, in dependence on radio resource usage of the respective other RF carrier;
   configuring wireless communication devices to use respective ones of the BWPs, wherein for each BWP, the network node obtains a resource-usage pattern associated with the respective other RF carrier; and
   reserving the radio resources identified in the resource-usage pattern to avoid conflicting use of the radio resources with respect to downlink or uplink transmissions on the first RF carrier, wherein the resource-usage pattern is exchanged, the exchanging of the resource-usage pattern is determined based on a mechanism available for a spectrum-sharing arrangement.

7. The method of claim 6, wherein determining the frequency-sharing configuration for each BWP comprises obtaining at least one of resource-usage patterns and resource scheduling information from a network entity associated with the respective other RF carrier.

8. The method of claim 6, wherein configuring the wireless communication devices to use respective ones of the BWPs includes, for the one or more wireless communication devices configured to use a particular BWP, sending an indication of the resource-usage pattern, thereby enabling the wireless communication devices to use, or account for, rate matching around radio resource elements reserved according to the resource-usage pattern.

9. The method of claim 8, wherein, for each BWP, the network node obtains or cooperatively determines how the bandwidth shared by the BWP and the respective other RF carrier is to be shared, at least for data transmissions.

10. The method of claim 6, wherein determining the frequency-sharing configuration for each BWP comprises cooperatively determining the frequency-sharing configuration based on communicating with a network entity associated with the respective other RF carrier.

11. The method of claim 6, wherein configuring the wireless communication devices to use respective ones of the BWPs comprises assigning a particular one or ones of the wireless communication devices to a particular BWP in dependence on one or more of the following factors: a traffic loading of the respective other RF carrier, a traffic loading of the particular BWP, differences in traffic loading across the two or more other RF carriers, or differences in traffic loading across the BWPs.

12. The method of claim 6, wherein the wireless communication devices are operating on the first RF carrier or are configured to be operated on the first RF carrier.

13. The method of claim 6, wherein the first RF carrier is a Fifth Generation (5G) New Radio (NR) carrier and the two or more other RF carriers are Fourth Generation (4G) Long Term Evolution (LTE) carriers, wherein the network node is a 5G radio network node that provides the first RF carrier, and wherein one or more 4G radio network nodes, integrated with or implemented apart from the 5G radio network node, provide the LTE carriers.

14. The method of claim 6, wherein the two or more other RF carriers are contiguous in frequency and the corresponding BWPs are contiguous in frequency.

15. The method of claim 6, wherein at least two of the two or more other RF carriers are not contiguous in frequency and the corresponding BWPs are not contiguous in frequency.

16. The method of claim 6, wherein a numerology used for the first RF carrier within at least one of the BWPs differs from a numerology used by the respective other RF carrier.

17. A method performed by a wireless communication device operating in a wireless communication network, the method comprising:
   receiving configuration information from a network node of the wireless communication network, configuring the wireless communication device for operation in a bandwidth part (BWP) of a first radio frequency (RF) carrier, the BWP being a respective one of two or more BWPs defined within the first RF carrier, each BWP aligned with a respective one of two or more other RF carriers that are positioned within the RF spectrum spanned by the first RF carrier and operated in a spectrum-sharing arrangement with the first RF carrier; and
   operating with respect to the BWP according to the configuration information, wherein the configuration information includes rate-matching information, and wherein operating with respect to the BWP part according to the configuration information comprises performing rate matching for uplink data transmissions or accounting for rate matching in downlink data transmission in accordance with the rate matching information, wherein the resource-usage pattern is exchanged, the exchanging of the resource-usage pattern is determined based on a mechanism available for the spectrum-sharing arrangement.

18. The method of claim 17, wherein the configuration information indicates reserved resources that are not used by the first RF carrier within the BWP, and wherein operating with respect to the BWP according to the configuration information comprises ignoring or otherwise not using the reserved resources with respect to transmission or reception operations at the wireless communication device.

\* \* \* \* \*